United States Patent
Bock et al.

(10) Patent No.: US 9,991,993 B2
(45) Date of Patent: Jun. 5, 2018

(54) TIME OFFSET VALIDATION OF COMPONENTS WITH INDEPENDENT SILICON CLOCKS

(71) Applicant: INTEL CORPORATION, Santa Clara, CA (US)

(72) Inventors: Anthony S. Bock, Vancouver, WA (US); Michael J. Greger, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 15/088,735

(22) Filed: Apr. 1, 2016

(65) Prior Publication Data

US 2017/0288818 A1 Oct. 5, 2017

(51) Int. Cl.
*H04L 1/18* (2006.01)
*H04L 1/16* (2006.01)
*H04L 1/00* (2006.01)

(52) U.S. Cl.
CPC ............ *H04L 1/1678* (2013.01); *H04L 1/188* (2013.01); *H04L 2001/0094* (2013.01)

(58) Field of Classification Search
CPC ........ H04L 1/189; H04L 1/1678; H04L 1/188
See application file for complete search history.

(56) References Cited

U.S. PATENT DOCUMENTS

| | | | |
|---|---|---|---|
| 6,545,981 B1 | 4/2003 | Garcia et al. | |
| 2007/0112994 A1 | 5/2007 | Sandven et al. | |
| 2012/0093211 A1 | 4/2012 | Ogami et al. | |
| 2013/0151857 A1 | 6/2013 | Agrawal | |
| 2013/0336334 A1* | 12/2013 | Gilbert | H04J 3/16 370/458 |
| 2014/0334582 A1 | 11/2014 | Bock et al. | |
| 2015/0109998 A1 | 4/2015 | Yang | |
| 2015/0317273 A1* | 11/2015 | Errickson | H04L 67/1095 709/248 |
| 2016/0188524 A1* | 6/2016 | Froelich | G06F 13/4059 710/106 |

OTHER PUBLICATIONS

International Search Report and Written Opinion dated May 24, 2017, on application No. PCT/US2017/020274.

* cited by examiner

*Primary Examiner* — Kyle Vallecillo
(74) *Attorney, Agent, or Firm* — Lowenstein Sandler LLP

(57) ABSTRACT

In accordance with embodiments disclosed herein, there is provided systems and methods for time offset validation of components with independent silicon clocks. A requesting component includes transmission logic to transmit timing protocol requests to a responding component, receiving logic to receive timing protocol responses, replay detection logic to detect a retransmission of a timing protocol message and to set an internal timing state of the requesting component as invalid, and validation logic to detect at least two consecutive timing protocol dialogs and set the internal timing state of the requesting component as valid. A responding component includes receiving logic, transmission logic, replay detection logic to detect a retransmission of a timing protocol message and set an internal timing state of the responding component as invalid, and validation logic to detect at least two consecutive timing protocol dialogs and set the internal timing state of the responding component as valid.

25 Claims, 16 Drawing Sheets

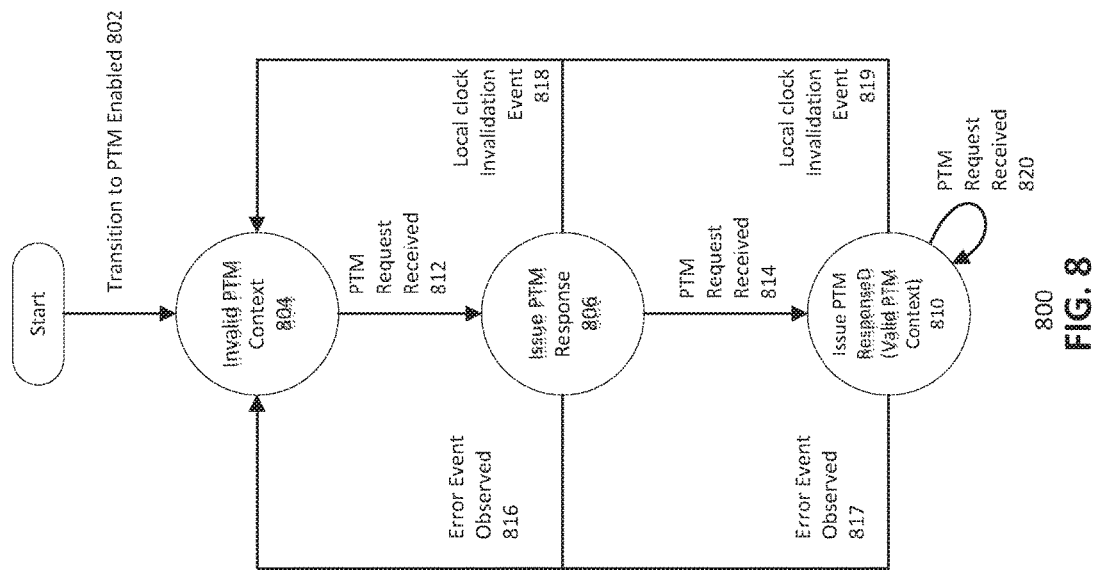

TIME OFFSET VALIDATION OF COMPONENTS WITH INDEPENDENT SILICON CLOCKS

BRIEF DESCRIPTION OF THE DRAWINGS

FIG. 8 is a flow diagram of a method of time offset validation of the responding component, according to another embodiment.

DESCRIPTION OF EMBODIMENTS

Figure 1:
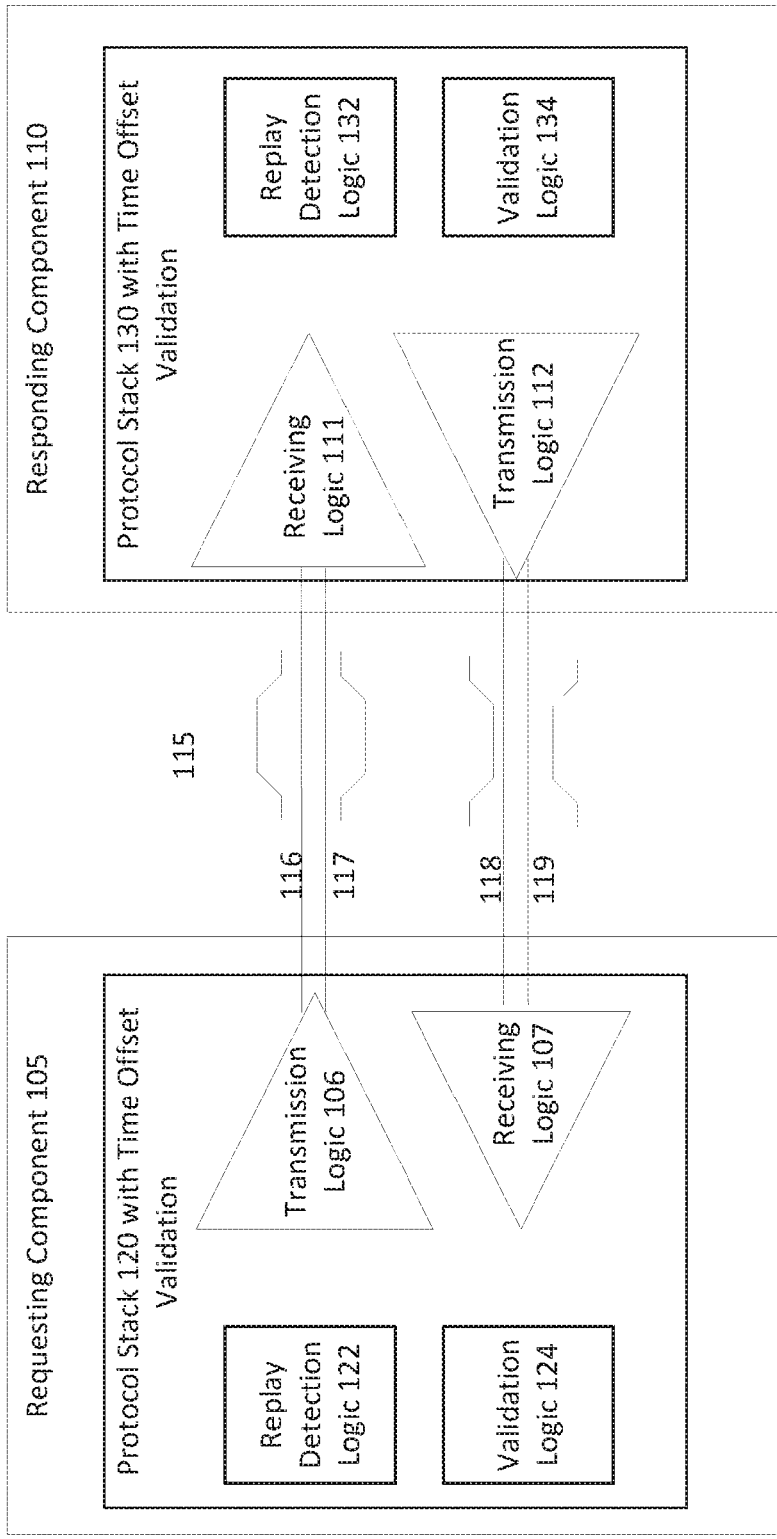
FIG. 1 illustrates a requesting component and a responding component in an interconnect architecture with time offset validation logic, according to one embodiment.

Devices communicate with one another over an interconnect or link. A link may be a point-to-point communication channel between two components, allowing both components to send and receive requests and responses. These components may have independent silicon based clocks that do not keep the same time. The components may send messages to each other and receive messages from each other over one or more lanes. At the physical level, a link is composed of one or more lanes, where one lane is composed of two differential signaling pairs; one pair for receiving data and one pair for transmitting data. The components may send and receive messages to coordinate time offset measurements between the components. For example, the PCIe® (Peripheral Component Interconnect Express) Precision Timing Measurement (PTM) protocol enables components to obtain precise time information from other components by transmission of messages between the components. The PTM protocol includes procedures for handling errors that may occur in the transmission of PTM messages. For example, a first component may send a transaction layer packet (TLP) (e.g., a PTM message: a PTM request, a PTM response, or PTM responseD) to a second component and the second component may send a data link layer packet (DLLP) (e.g., acknowledgement message (ACK) or negative acknowledgement message (NAK)) to the first component in response to the TLP received. As described herein, the term "PTM response" may refer to a PTM response with a data payload (PTM responseD) or a PTM response without a data payload (PTM response) unless further described. This pairwise exchange of a PTM request followed by PTM response/responseD message is referred to as a PTM dialog. PTM relies on the successful transmission of the PTM dialogs, both the constituent TLP messages and corresponding ACKs to deliver accurate timing information to the system. The ACK serves as an additional check on the successful transmission of TLPs, not only PTM TLPs. Errors may occur in the transmission of TLPs and ACKs. For example, a TLP or ACK may not be received, a TLP or ACK may be observed as corrupted, a TLP or ACK may not be received before a timeout period expires, or a NAK may be received. For most TLPs, correct operation is to retransmit the TLP in the case of an error. For PTM TLPs, this retransmission will enable successful exchange of the messages, but because the receipt/transmission of PTM TLPs also causes the hardware to latch timing information, retransmissions may lead to errors in the timing information. Conventionally, components were not able to detect errors relating to the transmission of ACKs. For example, the first component will retransmit the same TLP to a second component if the first component receives a NAK, receives a corrupted ACK, or does not receive an ACK before expiration of a timeout period. The first component will continue sending the same TLP to the second component until the first component receives an ACK that is not observed as corrupted before expiration of a timeout period in conventional solutions. The retransmission of any PTM TLP can lead to errors in the timing calculations.

One conventional solution uses software to watch for anomalous results. Using software to watch for anomalous results incurs an additional operation and overhead for every message transmission and not just transmissions when errors occur. The magnitudes of errors may vary, so erroneous results that are close enough to expected values may avoid detection and may not be detected by the software. These subtle errors will degrade the accuracy leading to undesired operation.

To avoid these errors in timing calculations and to avoid errors and overhead incurred by software watching for anomalous results, in the embodiments described herein, a component can assume the state of the component is invalid whenever the component observes a retransmission of a PTM TLP. A requesting component, upon observing a retransmission of a PTM request, PTM response, or responseD, may mark the internal timing of the requesting component as invalid and reissue new PTM requests until two consecutive PTM dialogs complete without error and the second PTM dialog includes a PTM responseD, at which time the internal timing state of the requesting component has been reestablished and normal operation may be resumed. A responding component, upon observing a retransmission of a PTM request, PTM response, or PTM responseD, may mark the internal timing of the responding component as invalid and may issue a PTM response TLP without a data payload when the responding component receives each PTM request TLP until two consecutive PTM dialogs complete without error, at which time the internal timing state of the responding component has been reestablished and normal operation may be resumed. The embodiments described herein may be backward compatible with one or more existing PTM specifications. The embodiments described herein may work with existing and future devices to improve the overall behavior without replacing both ends of the link. The embodiments described herein may be implemented in only the requesting component, may be implemented in only the responding component, or may be implemented in both the requesting component and the responding component. Even if the embodiments described herein are only implemented in one of the requesting or responding component, the embodiments described herein will still perform better than an implementation that purely uses a traditional PTM specification.

Referring to FIG. 1, an embodiment of a requesting component 105 and a responding component 110 in an interconnect architecture with time offset validation logic is illustrated. In one embodiment, FIG. 1 illustrates a serial point-to-point link that includes any transmission path for transmitting serial data. In another embodiment, FIG. 1 illustrates a PCIe® serial point-to-point fabric.

In one embodiment, requesting component 105 includes a protocol stack 120 with time offset validation. The protocol stack 120 with time offset validation may be a timing protocol. The protocol stack 120 may include transmission logic 106, receiving logic 107, replay detection logic 122, and validation logic 124. The transmission logic 106 may transmit timing protocol requests to responding component 110 via a link 115. The receiving logic 107 may receive timing protocol responses from the responding component via the link 115 in response to the timing protocol requests. The replay detection logic 122 may detect a retransmission of a timing protocol message (e.g., a timing protocol request, a timing protocol response) and may set an internal timing state of the requesting component 105 as invalid in response to the retransmission. The validation logic 124 may detect at least two consecutive timing protocol dialogs (e.g., a first timing protocol dialog (e.g., a first non-retransmitted timing protocol request and a first non-retransmitted timing protocol response) and a second timing protocol dialog (e.g., a second non-retransmitted timing protocol request and a second non-retransmitted timing protocol response) and the validation logic 124 may set the internal timing state of the requesting component 105 as valid in response to completion of the at least two consecutive timing protocol dialogs.

In one embodiment, the completion of the at least two consecutive timing protocol dialogs comprises receiving the second non-retransmitted timing protocol response, wherein the second non-retransmitted timing protocol response has a data payload. In another embodiment, the requesting component 105 consecutively transmits, via the transmission logic 106, timing protocol requests until the at least two consecutive timing protocol dialogs complete with any retransmissions. In another embodiment, the validation logic 124 sets the internal timing state as valid using timing information from the second non-retransmitted timing protocol response. In another embodiment, the receiving logic 107 disregards data payloads of timing protocol responses received after the retransmission until at least one timing protocol dialog that does not have errors or retransmissions completes.

The responding component 110 may include a protocol stack 130 with time offset validation. The protocol stack 130 with time offset validation may be a timing protocol. The protocol stack 130 may include transmission logic 112, receiving logic 111, replay detection logic 132, and validation logic 134. The receiving logic 111 may receive timing protocol requests from a requesting component 105 via a link 115. The transmission logic 112 may transmit timing protocol responses to the requesting component 105 via the link 115 in response to the timing protocol requests. The replay detection logic 132 may detect a retransmission of the timing protocol message and to set an internal timing state of the responding component as invalid in response to the retransmission. The validation logic 134 may detect at least two consecutive timing protocol dialogs including the first timing protocol dialog and the second timing protocol dialog In one embodiment, each timing protocol request comprises a Precision Timing Measurement (PTM) request, each timing protocol response comprises a PTM response, the timing protocol message comprises a PTM message, and each timing protocol dialog comprises a PTM dialog. In another embodiment, the completion of the at least two consecutive timing protocol dialogs comprises transmitting the second non-retransmitted timing protocol response, wherein the second non-retransmitted timing protocol response has a data payload. In another embodiment, the first non-retransmitted timing protocol response and the second non-retransmitted timing protocol request are consecutively transmitted by the requesting component to the responding component. In another embodiment, the transmission logic is to transmit timing protocol responses without data payloads in response to timing protocol requests received after the retransmission until at least one timing protocol dialog that does not have errors or retransmissions completes.

In one embodiment, the timing protocol may is a PCIe® Precision Timing Measurement (PTM) protocol. Each timing protocol request may include a Precision Timing Measurement (PTM) request, each timing protocol response may include a PTM response, the timing protocol message may include a PTM message, and each timing protocol dialog may include a PTM dialog.

A primary goal of PCIe® is to enable components and devices from different vendors to inter-operate in an open architecture, spanning multiple market segments; Clients (Desktops and Mobile), Servers (Standard and Enterprise), and Embedded and Communication devices. PCIe® is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCIe® take advantage of advances in point-to-point interconnects, Switch-based technology, and packetized protocol to deliver new levels of performance and features. Power Management, Quality of Service (QoS), Hot-Plug/Hot-Swap support, Data Integrity, and Error Handling are among some of the advanced features supported by PCIe®.

A basic PCIe® link includes two, low-voltage, differentially driven signal pairs: a transmit pair 106/111 and a receive pair 112/107. Accordingly, requesting component 105 includes transmission logic 106 to transmit data to responding component 110 and receiving logic 107 to receive data from responding component 110. Responding component 110 includes transmission logic 112 to transmit data to requesting component 105 and receiving logic 111 to receive data from requesting component 105. In other words, two transmitting paths, i.e. paths 116 and 117, and two receiving paths, i.e. paths 118 and 119, are included in a PCIe® link. In one embodiment, requesting component 105 may be a downstream component and responding component 110 may be an upstream component. Responding component 110 may have access to master information (e.g., PTM master time) and requesting component 105 may have access to local information (e.g., local time).

A transmission path refers to any path for transmitting data, such as a transmission line, a copper line, an optical line, a wireless communication channel, an infrared communication link, or other communication path. A connection between two devices or components, such as requesting component 105 and responding component 110, is referred to as a link (e.g., a transmission medium), such as link 115. PCIe® components communicate via a logical connection called an interconnect or link. A link is a point-to-point communication channel between two PCIe® ports allowing both of them to send and receive ordinary PCI requests (configuration, I/O or memory read/write) and interrupts (INTx, MSI or MSI-X). At the physical level, a link is composed of one or more lanes. Low-speed peripherals (such as a card using the 802.11 Wi-Fi® technology) use a single-lane (×1) link, while a graphics adapter typically uses a much wider and faster 16-lane link. A PCIe® link between two components includes one or more lanes, each lane representing two differential signaling pairs (one pair for transmission, one pair for reception). The one or more lanes are dual simplex channels using two differential signaling pairs. Thus, each lane is composed of four wires or signal traces. Conceptually, each lane is used as a full-duplex byte stream, transporting data packets in eight-bit "byte" format simultaneously in both directions between endpoints of a link. Physical PCIe® links may contain from one to 32 lanes, more precisely 1, 2, 4, 8, 12, 16 or 32 lanes. Lane counts are written with an "×" prefix (for example, "×8" represents an eight-lane card or slot), with ×16 being the largest size in common use. To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 116 and 117, to transmit differential signals. As an example, when line 116 toggles from a low voltage level to a high voltage level, i.e. a rising edge, line 117 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

The bonded serial bus architecture may be chosen over the traditional parallel bus due to inherent limitations of the latter, including half-duplex operation, excess signal count, and inherently lower bandwidth due to timing skew. Timing skew results from separate electrical signals within a parallel interface traveling through conductors of different lengths, on potentially different printed circuit board (PCB) layers, and at possibly different signal velocities. Despite being transmitted simultaneously as a single word, signals on a parallel interface experience different travel times and arrive at their destinations at different moments. When the interface clock rate is increased to a point where its inverse (that is, its clock period) is shorter than the largest possible time between signal arrivals, the signals no longer arrive with sufficient coincidence to make recovery of the transmitted word possible. Since timing skew over a parallel bus can amount to a few nanoseconds, the resulting bandwidth limitation is in the range of hundreds of megahertz.

A serial interface does not exhibit timing skew because there is only one differential signal in each direction within each lane, and there is no external clock signal since clocking information is embedded within the serial signal itself. As such, typical bandwidth limitations on serial signals are in the multi-gigahertz range. PCIe® is one example of the general trend toward replacing parallel buses with serial interconnects; other examples include Serial ATA (SATA), USB, Serial Attached SCSI (SAS), FireWire (IEEE 1394), and RapidIO. Multichannel serial design increases flexibility with its ability to allocate fewer lanes for slower devices.

Requesting component 105 includes a protocol stack 120 with time offset validation. The protocol stack 120 includes a transmission logic 106, a receiving logic 107, a replay detection logic 122, and a validation logic 124. Transmission logic 106 may transmit Precision Timing Measurement (PTM) requests, ACKs, and NAKs to responding component 110 via link 115. Transmission logic 106 may transmit a NAK in response to receiving a PTM response/responseD that is corrupted (bad LCRC (link cyclical redundancy check), bad framing, wrong sequence number). Receiving logic 107 may receive ACKs, NAKs, and PTM responses (e.g., PTM response, PTM responseD) from the responding component 110 via the link 115 in response to the PTM requests. Receiving logic 107 receiving a NAK instructs the transmission logic 106 to retransmit one or more PTM requests (the NAK includes the sequence number of the last PTM response/responseD that was received successfully and may cause zero, one, or more PTM requests with later sequence numbers to be transmitted). Replay detection logic 122 may detect a retransmission of a PTM message (e.g., retransmission of a PTM request to the responding component 110 by the transmission logic 106, retransmission of a PTM response/responseD received by the receiving logic 107 from the responding component 110). The replay detection logic 122 may set an internal timing state of the requesting component 105 as invalid in response to the retransmission of the PTM message (e.g., retransmission of a PTM request by the transmission logic 106, retransmission of a PTM response/responseD from the responding component 110 received by the receiving logic 107). In one embodiment, replay detection logic 122 includes a retry buffer 916 to detect retransmission of a PTM request and a Lnk TLP processing 906 to detect retransmission of a PTM response/responseD (see FIG. 9a). Validation logic 124 may detect at least two consecutive successful PTM dialogs (e.g., PTM dialogs that complete without errors and without retransmissions) by monitoring the receiving logic 107 and the transmission logic 106. In one embodiment, validation logic 124 may detect PTM response/responseDs, NAKs, ACKs, and retransmissions received by the receiving logic 107, enabling the validation logic 124 to determine the success or failure of PTM dialogs initiated by the transmission logic 106. The validation logic 124 may set the internal timing state of the requesting component 105 as valid in response to at least two consecutive PTM dialogs being completed.

In one embodiment, the validation logic 124 sets the internal timing state of the requesting component 105 as valid in response to the receiving logic 107 and transmission logic 106 successfully completing two consecutive PTM dialogs and the second PTM dialog includes a PTM responseD.

Responding component 110 includes a protocol stack 130 with time offset validation. The protocol stack 130 includes a receiving logic 111, a transmission logic 112, a replay detection logic 132, and a validation logic 134. Receiving logic 111 may receive ACKs, NAKs, and PTM requests from the requesting component 105 via the link 115. Receiving logic 111 receiving a NAK instructs the transmission logic 112 to retransmit one or more PTM response/responseDs (the NAK includes the sequence number of the last PTM request that was received successfully and may cause zero, one, or more PTM response/responseDs with later sequence numbers to be transmitted). Transmission logic 112 may transmit ACKs, NAKs, and PTM responses (e.g., PTM response, PTM responseD) to the requesting component 105 via the link 115 in response to the PTM requests. Transmission logic 112 may transmit a NAK in response to receiving a PTM request that is corrupted (bad LCRC (link cyclical redundancy check), bad framing, wrong sequence number). Replay detection logic 132 may detect a retransmission of a PTM message (e.g., retransmission of a PTM request from the requesting component 105 received by the receiving logic 111, retransmission of a PTM response/responseD by the transmission logic 112). In one embodiment, replay detection logic 132 includes a retry buffer 916 to detect retransmission of a PTM response/responseD and a Lnk TLP processing 906 to detect retransmission of a PTM request (see FIG. 9*b*). The replay detection logic 132 may set an internal timing state of the responding component 110 as invalid in response to the retransmission of the PTM message. Validation logic 134 may detect at least two consecutive successful PTM dialogs (e.g., PTM dialogs that complete without errors and without retransmissions) by monitoring the receiving logic 111 and the transmission logic 112, where the validation logic 134 is to set the internal timing state of the responding component 110 as valid in response to the at least two consecutive successful PTM dialogs being completed.

In one embodiment, the validation logic 134 sets the internal timing state of responding component 110 as valid in response to the receiving logic 111 and transmission logic 112 completing at least two consecutive PTM dialogs. In another embodiment, the receiving logic 111 does not receive the PTM request in a first instance before the receiving logic 111 receives the PTM request in a second instance. In another embodiment, the receiving logic 111 receives the PTM request in a first instance and the transmission logic 112 does not transmit an ACK to the requesting component 105 before expiration of a timeout period in response to the receiving logic 111 receiving the PTM request in the first instance. In another embodiment, the receiving logic 111 receives the PTM request in a first instance and the transmission logic 112 transmits an ACK to the requesting component 105 and the ACK is observed to be lost or corrupted in the receiving logic 107 of the requesting component 105. In another embodiment, the transmission logic 112 transmits a PTM response without a data payload when the internal timing state of responding component 110 is invalid.

Figure 2:
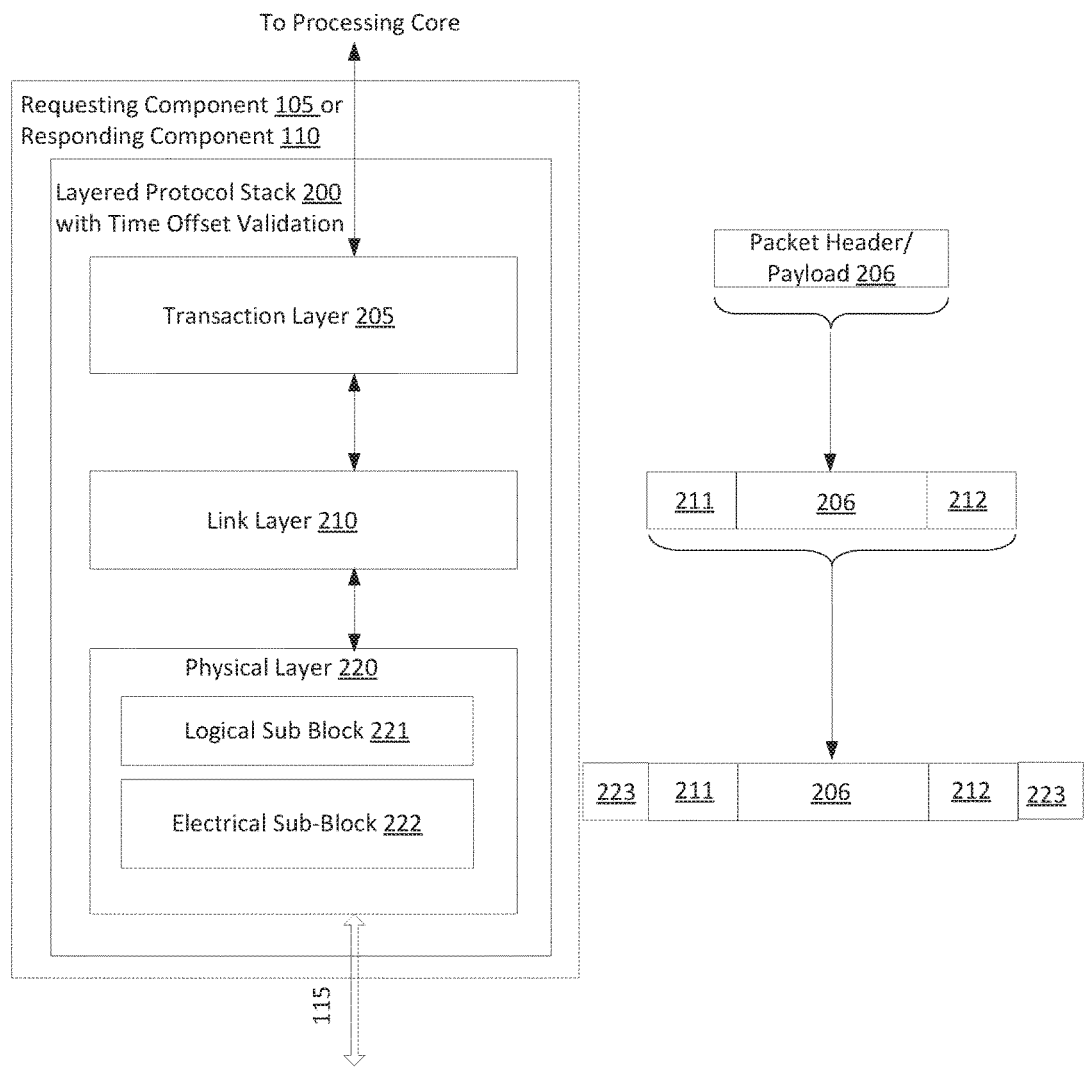
FIG. 2 illustrates a layered protocol stack of an interconnect with time offset validation logic, according to one embodiment.
Figure 3:
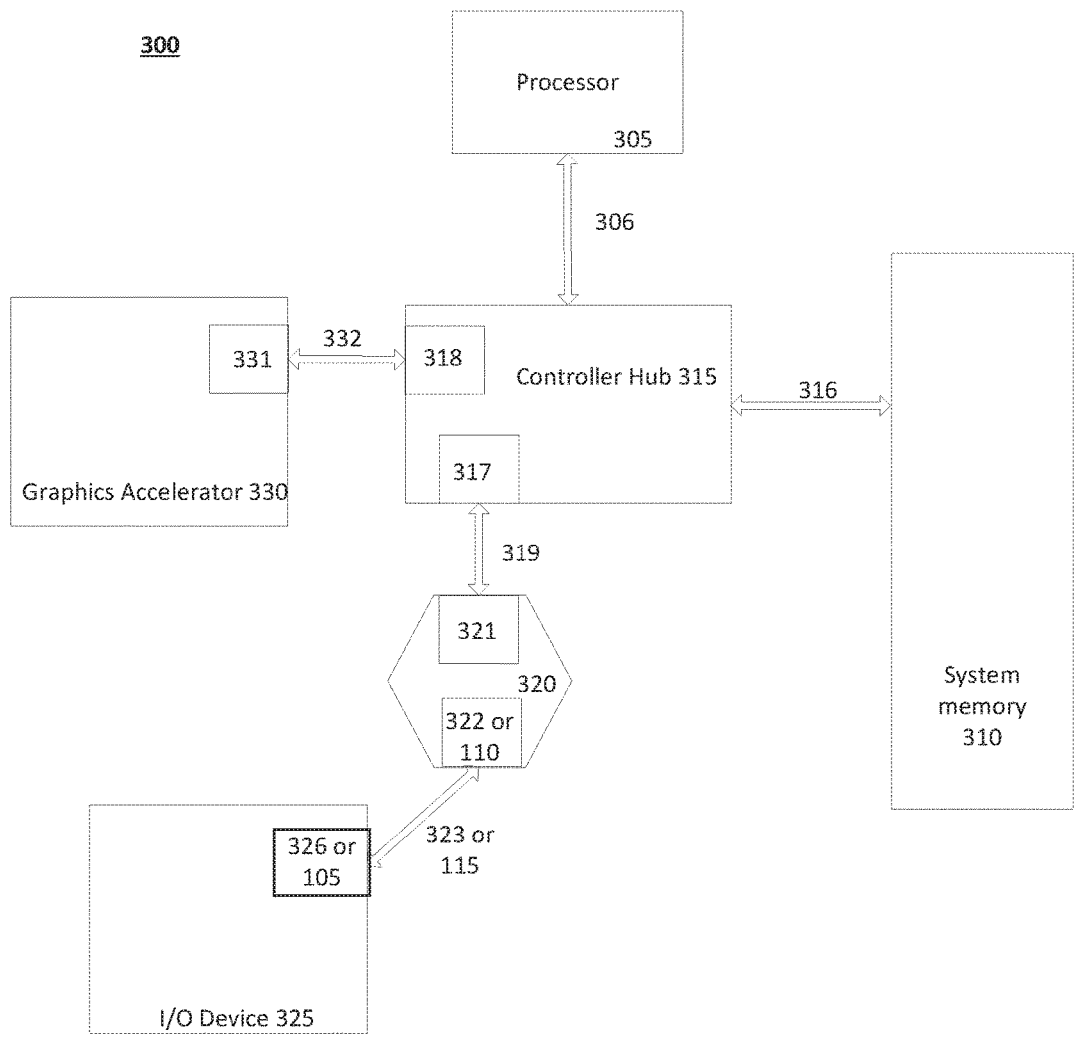
FIG. 3 illustrates a computing system with multiple interconnects with time offset validation logic, according to one embodiment.

Turning to FIG. 2, an embodiment of a layered protocol stack 200 of an interconnect with time offset validation is illustrated. In one embodiment, layered protocol stack 200 is protocol stack 120 of requesting component 105 of FIG. 1. In another embodiment, layered protocol stack 200 is protocol stack 130 of responding component 110 of FIG. 1. Layered protocol stack 200 includes any form of a layered communication stack, such as a Quick Path Interconnect (QPI) stack, a PCIe® stack, a next generation high performance computing interconnect stack, or other layered stack. Although portions of the discussion in reference to FIGS. 1-3 are in relation to a PCIe® stack, the same concepts may be applied to other interconnect stacks. In one embodiment, protocol stack 200 is a PCIe® protocol stack including transaction layer 205, link layer 210, and physical layer 220. An interface, such as interfaces 317, 318, 321, 322, 326, and 331 in FIG. 3, may be represented as communication protocol stack 200. Representation as a communication protocol stack may also be referred to as a module or interface implementing/including a protocol stack.

PCIe® uses packets (e.g., TLPs, including PTM request, PTM response, PTM responseD, and so forth; and DLLPs (data link layer packets) such as ACKs and NAKs) to communicate information between components. TLPs are formed in the Transaction Layer 205 and DLLPs are formed in the Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The transaction layer 205 typically manages credit-base flow control for TLPs. PCIe® implements split transactions, i.e. transactions with request and response separated by time, allowing a link to carry other traffic while the target device gathers data for the response.

In addition PCIe® utilizes credit-based flow control. In this scheme, a device advertises an initial amount of credit for each of the receive buffers in Transaction Layer 205. An external device at the opposite end of the link (e.g., controller hub 315) counts the number of credits consumed by each TLP. A transaction may be transmitted if the transaction does not exceed a credit limit. Credits are restored when the transaction layer 205 receives a TLP, processes the TLP, and instructs the link layer 210 to transmit a flow control update (FCU) DLLP indicating how many credits have been freed. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe® devices. Transactions to the configuration space include read requests and write requests.

Message space transactions (or, simply messages) are defined to support in-band communication between PCIe® agents.

Therefore, in one embodiment, transaction layer 205 assembles packet header/payload 206. Format for current packet headers/payloads may be found in the PCIe® specification at the PCIe® specification website.

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one embodiment, physical layer 220 includes logical sub-block 221 and electrical sub-block 222 to physically transmit a packet to an external device. Here, logical sub-block 221 is responsible for the "digital" functions of Physical Layer 220. In this regard, the logical sub-block includes a transmit section to prepare outgoing information for transmission by electrical sub-block 222, and a receiver section to identify and prepare received information before passing it to the Link Layer 210.

Electrical sub-block 222 includes a transmitter and a receiver (e.g., transmission logic 106 and receiving logic 107, receiving logic 111 and transmission logic, and so forth). The transmitter is supplied by logical sub-block 221 with symbols, which the transmitter serializes and transmits onto to an external device, such as component 204. In one embodiment, component 202 is requesting component 105 and component 204 is responding component 110. In another embodiment, component 202 is responding component 110 and component 204 is requesting component 105. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. In another embodiment, a 128b/130b transmission code is employed. Here, special symbols are used to frame a packet with frames 223. In addition, in one example, the receiver also provides a symbol clock recovered from the incoming serial stream.

In one embodiment, FIG. 2 illustrates a requesting component 105. Transaction layer 205 generates a PTM request which the transaction layer 205 transmits to link layer 210. Link layer 210 transmits the PTM request to physical layer 220 which transmits the PTM request by the transmission logic 106 in the electrical sub-block 222 via link 115. Receiving logic 107 of requesting component 105 receives a PTM response/responseD in electrical sub-block 222 of physical layer 220 via link 115. Physical layer 220 transmits the PTM response/responseD to link layer 210 which transmits the PTM response/responseD to transaction layer 205. Transaction layer 205 decodes the PTM response/responseD which completes a PTM dialog. Completion of a PTM dialog is one of the conditions that allows the requesting component 105 to transmit a new PTM request.

In another embodiment, requesting component 105, via link layer 210, generates an ACK, link layer 210 transmits the ACK to physical layer 220, and physical layer 220 transmits the ACK to the responding component 110 via link 115. The link layer 210 may generate an ACK based on the PTM response/responseD having a correct cyclic redundancy check (CRC) and sequence number. In another embodiment, requesting component 105 receives an ACK in response to transmitting a PTM request.

In another embodiment, the transaction layer 205 decodes the PTM response/responseD, after which the transaction layer 205 may generate another PTM request to transmit to the physical layer 220 and for the physical layer to transmit via link 115.

Requesting component 105, via the link layer 210, may detect a retransmission of a PTM request in a second instance or retransmission of a PTM response/responseD in a second instance. The requesting component 105, via the transaction layer 205 or link layer 210, may set the internal timing state of the requesting component 105 as invalid in response to detecting the retransmission. The requesting component 105, via the transaction layer 205 or link layer 210, may detect the successful completion of two consecutive PTM dialogs via the physical layer 220. The requesting component 105, via the transaction layer 205 or link layer 210, may set the internal timing state of the requesting component 105 as valid in response to detecting the two consecutive successful PTM dialogs.

In another embodiment, FIG. 2 illustrates a responding component 110. Responding component 110 may receive a PTM request via receiving logic 111 in electrical sub-block 222 of physical layer 220. Physical layer 220 may transmit the PTM request to link layer 210 which then transmits the PTM request to transaction layer 220. Transaction layer 220 may decode the PTM request and generate a PTM response/responseD to transmit to link layer 210 which transmits to physical layer 220. Transmission logic 112 of electrical sub-block 222 of physical layer 220 may transmit the PTM response/responseD to requesting component 105 via link 115. In another embodiment, responding component 110 may transmit an ACK to requesting component 105 via link 115. In another component, responding component 110 may decode a PTM request in transaction layer 205 and generate a PTM response/responseD in transaction layer 205 and an ACK in link layer 210 to transmit to physical layer 220 which transmits via link 115.

Responding component 110 may detect, via link layer 210 or transaction layer 205, a retransmission of a PTM message (e.g., retransmission of a PTM request in a second instance, retransmission of a PTM response/responseD in a second instance). The responding component 110, via the transaction layer 205 or link layer 210, may set the internal timing state of the responding component 110 as invalid in response to detecting the retransmission. The responding component 110 may generate a PTM response without a data payload in response to receiving a PTM request when the internal timing state of the responding component 110 is set as invalid.

The responding component 110, via the transaction layer 205 or link layer 210, may detect completing two consecutive PTM dialogs, via the physical layer 220. The responding component 110, via the transaction layer 205 or link layer 210, may set the internal timing state of the responding component 110 as valid in response to detecting the two consecutive successful PTM dialogs.

As stated above, although transaction layer 205, link layer 210, and physical layer 220 are discussed in reference to a specific embodiment of a PCIe® protocol stack, a layered protocol stack is not so limited. In fact, any layered protocol may be included/implemented. As an example, a port/interface that is represented as a layered protocol includes:

(1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring to FIG. 3, an embodiment of a computer system 300 with multiple interconnects with time offset validation logic is illustrated. System 300 includes processor 305 and system memory 310 coupled to controller hub 315. Processor 305 includes any processing element, such as a microprocessor, a host processor, an embedded processor, a co-processor, or other processor. Processor 305 is coupled to controller hub 315 through front-side bus (FSB) 306. In one embodiment, FSB 306 is a serial point-to-point interconnect as described below. In another embodiment, link 306 includes a serial, differential interconnect architecture that is compliant with different interconnect standard.

System memory 310 includes any memory device, such as random access memory (RAM), non-volatile (NV) memory, or other memory accessible by devices in system 300. System memory 310 is coupled to controller hub 315 through memory interface 316. Examples of a memory interface include a double-data rate (DDR) memory interface, a dual-channel DDR memory interface, and a dynamic RAM (DRAM) memory interface.

In one embodiment, controller hub 315 is a root hub, root complex, or root controller in a PCIe® interconnection hierarchy. Examples of controller hub 315 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 305, while controller 315 is to communicate with I/O devices, in a similar manner as described below. In some embodiments, peer-to-peer routing is optionally supported through root complex 315.

Here, controller hub 315 is coupled to switch/bridge 320 through serial link 319. Input/output modules 317 and 321, which may also be referred to as interfaces/ports 317 and 321, include/implement a layered protocol stack to provide communication between controller hub 315 and switch 320. In one embodiment, multiple devices are capable of being coupled to switch 320.

Switch/bridge 320 routes packets/messages from device 325 upstream, i.e. up a hierarchy towards a root complex, to controller hub 315 and downstream, i.e. down a hierarchy away from a root controller, from processor 305 or system memory 310 to device 325. Switch 320, in one embodiment, is referred to as a logical assembly of multiple virtual PCI-to-PCI bridge devices. Device 325 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe® vernacular, such as device, is referred to as an endpoint. Although not specifically shown, device 325 may include a PCIe® to PCI/PCI-X bridge to support legacy or other version PCI devices. Endpoint devices in PCIe® are often classified as legacy, PCIe®, or root complex integrated endpoints.

Graphics accelerator 330 is also coupled to controller hub 315 through serial link 332. In one embodiment, graphics accelerator 330 is coupled to an MCH, which is coupled to an ICH. Switch 320, and accordingly I/O device 325, is then coupled to the ICH. I/O modules 331 and 318 are also to implement a layered protocol stack to communicate between graphics accelerator 330 and controller hub 315. Similar to the MCH discussion above, a graphics controller or the graphics accelerator 330 itself may be integrated in processor 305.

I/O device 325 includes an interface 326 and switch/bridge 320 includes an interface 322. Interface 326 is coupled to interface 322 via serial link 323. Switch/bridge 320 may be higher in hierarchy than I/O device 325 and switch/bridge 320 may have access (directly or indirectly) to master information (e.g., PTM master time). I/O device 325 may have access to local information (e.g., local time). Interface 326 or I/O device 325 may include requesting component 105. Switch/bridge 320 or interface 322 may include responding component 105. Controller hub 315 or interface 317 may include responding component 105. Interface 321 on switch 320 may include a requesting component. I/O device may send timing protocol requests (e.g., PTM requests), via interface 326, to switch/bridge 320 which receives the PTM requests via interface 322. Switch/bridge 320 sends, via interface 322, timing protocol response (e.g., PTM response/responseD) in response to a timing protocol request via serial link 323 to I/O device 325 which receives the timing protocol response via interface 326. I/O device 325 and switch/bridge 320 may send an ACK or NAK in response to each timing protocol message received (e.g., PTM response, PTM responseD, PTM request).

An ACK may be observed as corrupted or may not be received by I/O device 325 or switch/bridge 320. In response to receiving a NAK or receiving an ACK that is not observed as corrupted not being received before a corresponding timeout period, I/O device 325 or switch/bridge 320 may retransmit the timing protocol message. The I/O device 325 may set the internal timing state of the I/O device 325 as invalid in response to detecting the retransmission of a timing protocol message until the I/O device 325 sets the internal timing state of the I/O device 325 as valid in response to the I/O device 325 successfully completing two consecutive timing protocol dialogs (e.g., two successful PTM dialogs) and the second timing protocol dialog includes a data payload (e.g., the second PTM dialog includes a PTM responseD). The switch/bridge 320 may set the internal timing state of the switch/bridge 320 as invalid in response to detecting the retransmission of a PTM message until the switch/bridge 320 sets the internal timing state of the switch/bridge 320 as valid in response to the switch/bridge 320 successfully completing two consecutive timing protocol dialogs. Switch/bridge 320 may transmit timing protocol responses without a data payload while the internal timing state of the switch/bridge 320 is invalid.

In one embodiment, short range wireless engines including a WLAN unit and a Bluetooth® unit may couple to processor 305 via an interconnect according to a PCIe® protocol, e.g., in accordance with the PCI Express® Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 305 via, e.g., a USB link or a universal asynchronous receiver transmitter (UART) link.

Figure 4A:
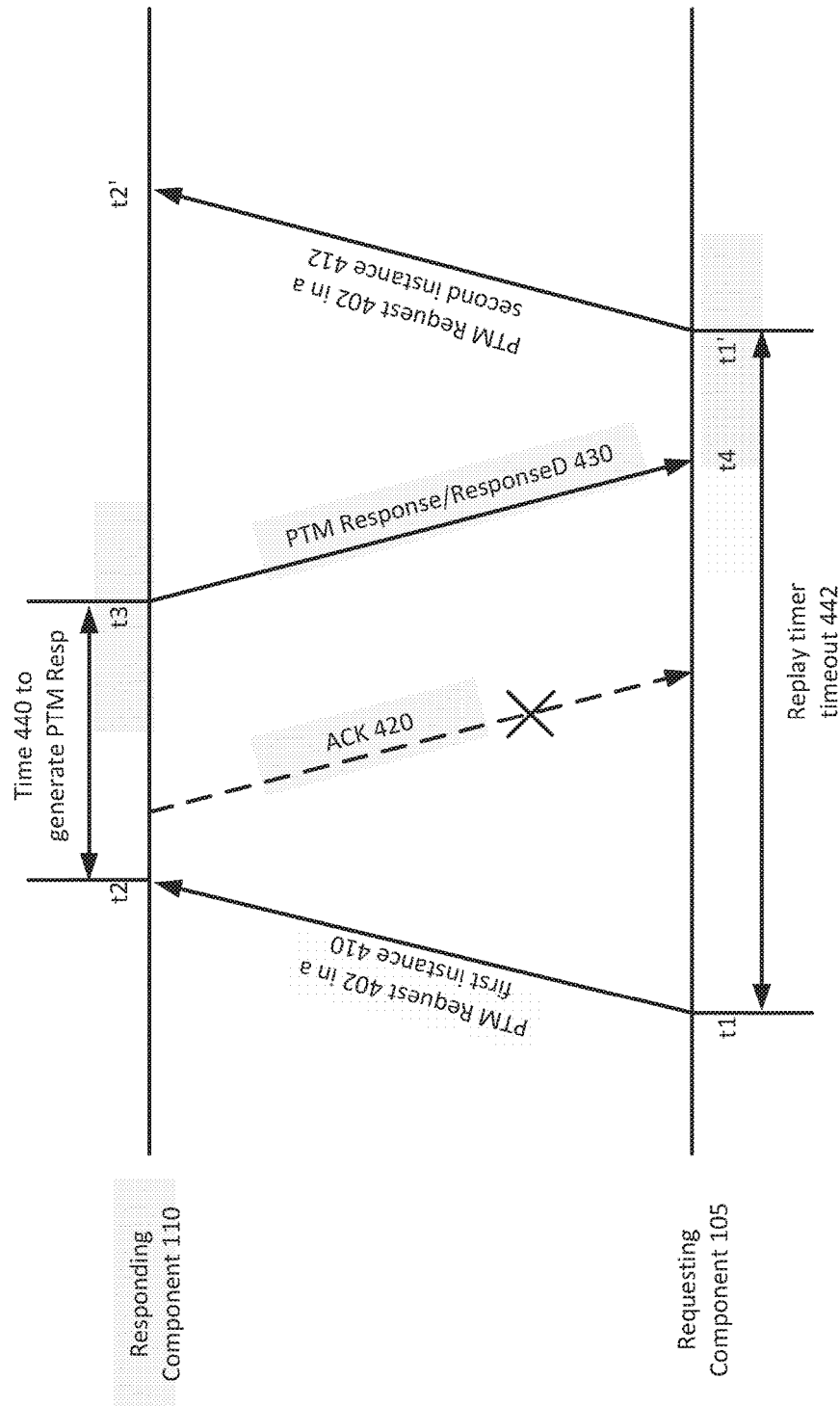
FIG. 4a illustrates transmission of Precision Timing Measurement (PTM) messages between the requesting component and the responding component, according to one embodiment.

FIG. 4a illustrates transmission of PTM messages between the requesting component 105 and the responding component 110, according to one embodiment.

The points t1, t2, t3, and t4 represent timestamps captured locally by each component (e.g., responding component 110, requesting component 105) as the component transmits and receives PTM messages. The component may store the timestamps from a first PTM dialog in internal registers for use in a second PTM dialog, and so on for subsequent PTM dialogs.

The requesting component 105 transmits a PTM request 402 in a first instance 410. The PTM request 402 includes the timestamp t1 captured locally by the requesting component 105. The responding component 110 receives PTM request 402 in the first instance 410 at t2. The responding component 110 may have access (directly or indirectly) to the PTM master time. The responding component 110 sends a PTM response/responseD 430 that includes the timestamp t2. The time 440 to generate the PTM response/D 430 may be t3 minus t2 as recorded during a previous PTM dialog (e.g., the time for PCIe®-SIP controller to generate a PTM response, less than 5 microseconds). The requesting component 105 may receive the PTM response/D at t4.

PTM request and PTM response messages may use a TLP type of Msg and may not include a data payload. PTM responseD messages may use a TLP type of MsgD and may include a 64 bit PTM master time field in bytes 8 through 15 of the TLP header and a 1 DW data payload containing the 32 bit propagation delay field. As used in this disclosure, the term "PTM response" may refer to a PTM response with a data payload (PTM responseD) or a PTM response without a data payload (PTM response) unless further described (e.g., unless described as "PTM response without a data payload," "PTM response with a data payload," and so forth).

A responding component 110 may transmit a PTM response without a data payload (e.g., without historical timestamps, without PTM master time at the receipt of the most recent PTM request, and so forth) when responding component 110 does not have historical timestamps with which to fulfill a PTM request. The responding component 110 may transmit a PTM responseD when the responding component 110 has stored copies of values required to populate the PTM response message (e.g., historical timestamps (t3-t2 as recorded during a previous PTM dialog), PTM master time at the receipt of the most recent PTM request message (t2 of the current PTM dialog)).

The requesting component 105 may not receive an ACK 420 from responding component 110 in response to the responding component 110 receiving the PTM request 402. In one embodiment, the responding component 110 does not send an ACK 420. In another embodiment, the responding component 110 sends an ACK 420 that is observed as corrupted before receipt by requesting component 105. In another embodiment, the responding component 110 sends an ACK 420, but requesting component does not receive the ACK 420 before a corresponding timeout period expires. In another embodiment, requesting component 105 receives a NAK from responding component 110 instead of an ACK.

In one embodiment, unless the requesting component 105 receives an ACK prior to the passage of the replay timer timeout 442 (e.g., before a corresponding timeout period expires), the requesting component 105 must retransmit a PTM request. The replay timer timeout may be about 4992 nanoseconds or about 5 microseconds. In response to requesting component 105 not receiving an ACK 420 that is not observed as corrupted before a replay timer timeout 442 expires (e.g., receiving a NAK, receiving an ACK that is observed as corrupted, and so forth), requesting component 105 may retransmit PTM request 402 in a second instance 403 with timestamp t1'. In response to requesting component 105 receiving a NAK that does not implicitly or explicitly acknowledge PTM request 402, the requesting component 105 may retransmit PTM request 402 in a second instance 403 with a timestamp t1'.

The responding component 110 may receive PTM request 402 in a second instance 412 at t2'. PTM request 402 in the second instance 412, as a retransmitted TLP, contains a sequence ID that matches an already completed transaction. PTM request 402 in the second instance 412 may cause the responding component 110 to overwrite the timestamp captured at t2 with the value captured at t2'. PTM request 402 in the second instance 412 may cause the requesting component 105 to overwrite the timestamp captured at t1 with the value captured at t1'.

Since the requesting component 105 sent a PTM request 402 at t1 and t1' and responding component 110 receives the PTM request 402 at t2 and t2', the requesting component 105 and the responding component 110 may now be out of sync and timing errors may result.

Figure 4B:
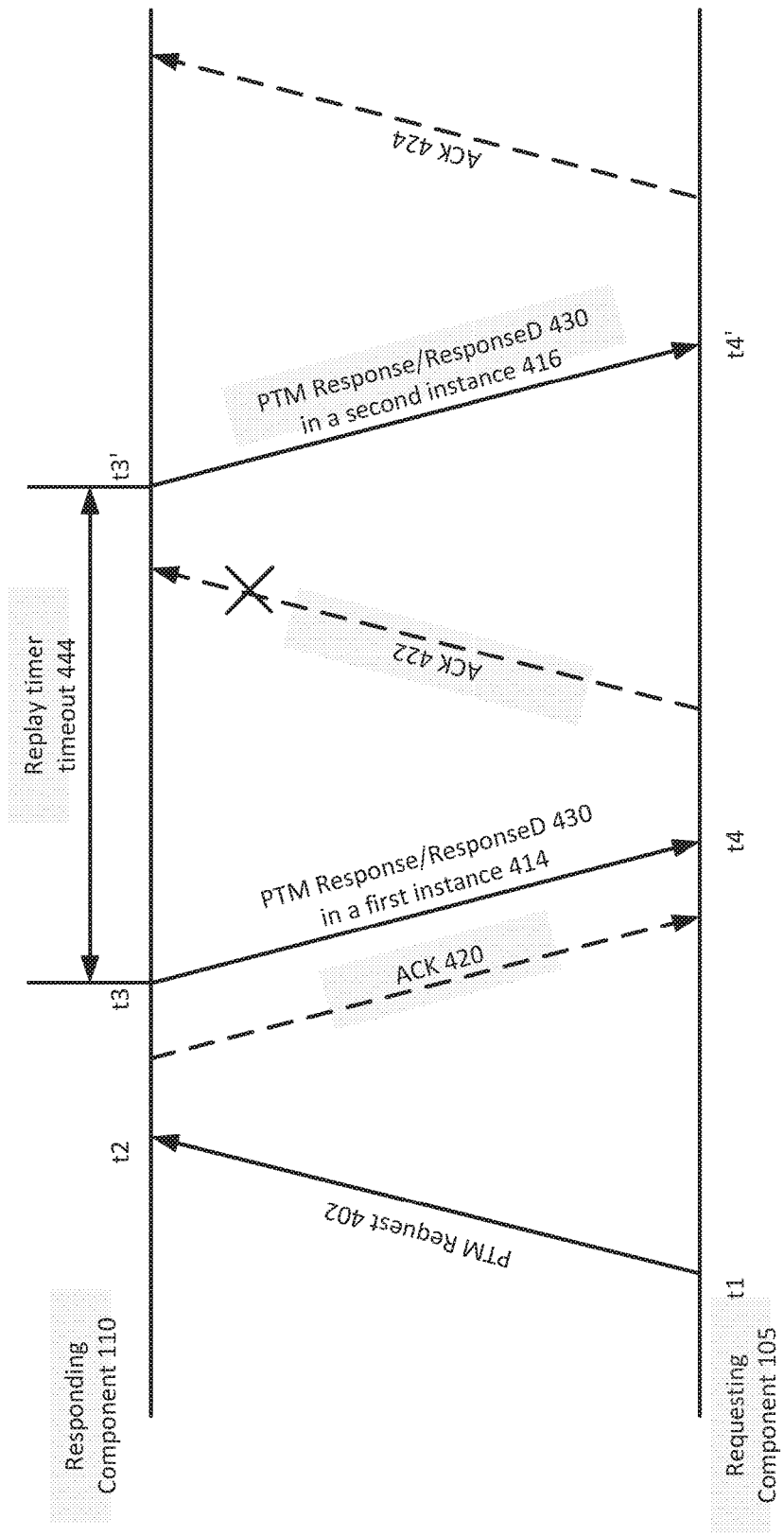
FIG. 4b illustrates transmission of PTM messages between the requesting component and the responding component, according to another embodiment.

FIG. 4b illustrates transmission of PTM messages between the requesting component 105 and the responding component 110, according to another embodiment.

The requesting component 105 transmits a PTM request 402 including timestamp t1 captured locally by requesting component 105. The responding component 110 receives the PTM request 402 at t2 and the responding component 110 transmits a PTM response/responseD 430 in a first instance 414 with a timestamp t2 which the requesting component 105 receives at t4. Responding component 110 may also send an ACK 420 which requesting component 105 receives. The responding component 110 may not receive an ACK 422 from requesting component 105 in response to requesting component 105 receiving the PTM response/D 430 in a first instance 414. In one embodiment, the requesting component 105 does not send an ACK 422. In another embodiment, the requesting component 105 sends an ACK 422 that is observed as corrupted prior to receipt by the responding component 110. In another embodiment, the requesting component 105 sends an ACK 422, but the responding component 110 does not receive the ACK 422 before a corresponding timeout period expires (e.g., replay timer timeout 444). In another embodiment, the requesting component 105 sends a NAK instead of an ACK to responding component 110.

In response to responding component 110 not receiving an ACK 422 that is not observed as corrupted before a corresponding timeout period expires (e.g., receiving a NAK, receiving an ACK that is observed as corrupted, and so forth), responding component 110 may retransmit PTM response/responseD 430 in a second instance 416 at time t3'. The requesting component 105 may send an ACK 424 in response to the requesting component 105 receiving the PTM response/D 430 in a second instance 416 at time t4'.

Since the responding component 110 sent a PTM response/responseD 430 with timestamps t3 and t3' (e.g., retransmission or replay of PTM response) and requesting component 105 receives the PTM response/responseD 430 at timestamps t4 and t4', the requesting component 105 and the responding component 110 may now be out of sync and timing errors may result.

Figure 5A:
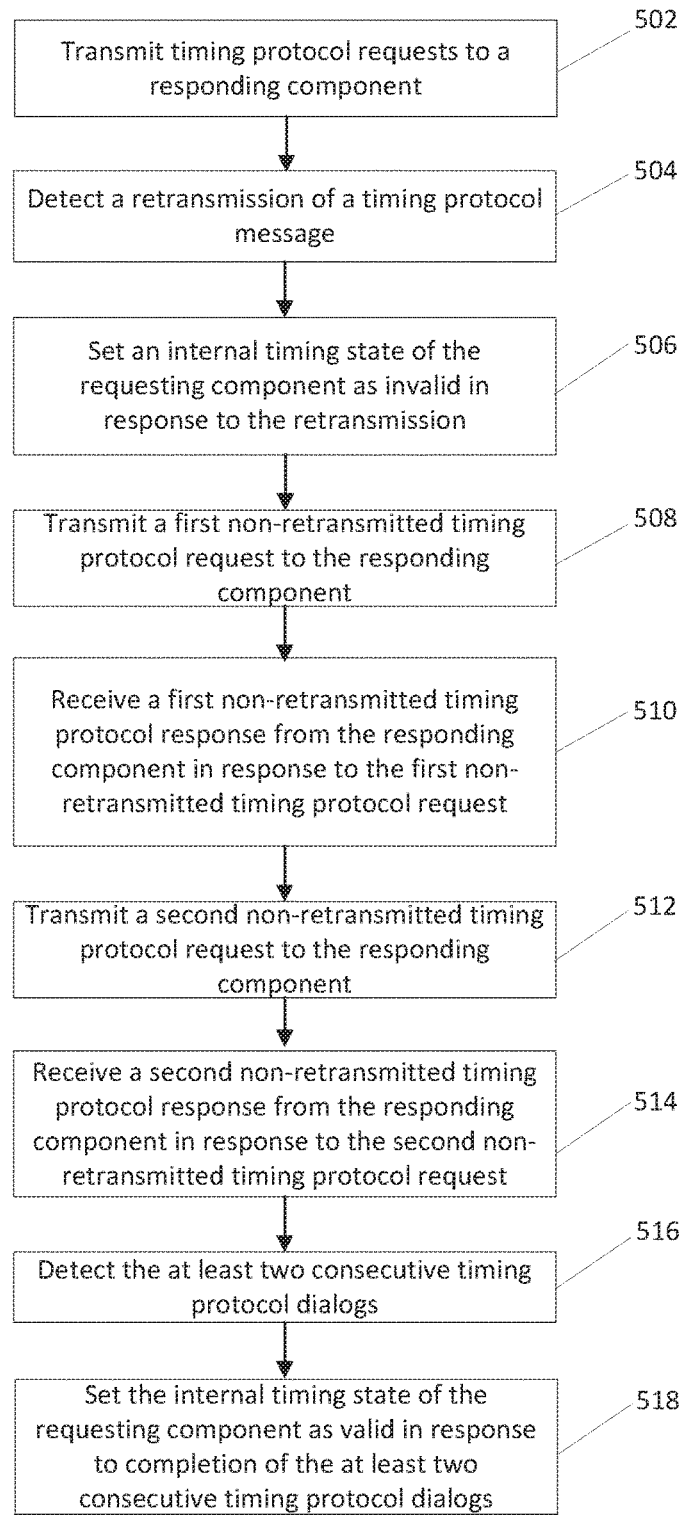
FIG. 5a is a flow diagram of a method of time offset validation of the requesting component, according to one embodiment.

FIG. 5a is a flow diagram of a method 500 of time offset validation of the requesting component 105 according to one embodiment. Method 500 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 500 may be performed, in part, by processor 305 described above with respect to FIG. 3.

For simplicity of explanation, the method 500 is depicted and described as a series of acts. However, acts in accordance with this disclosure can occur in various orders and/or concurrently and with other acts not presented and described herein. Furthermore, not all illustrated acts may be performed to implement the method 500 in accordance with the disclosed subject matter. In addition, those skilled in the art will understand and appreciate that the method 500 could alternatively be represented as a series of interrelated states via a state diagram or events.

Referring to FIG. 5a, at 502 the processing logic transmits, via transmission logic 106 of a requesting component 105, timing protocol requests (e.g., Precision Timing Measurement (PTM) requests) to a responding component 110 via a link 115.

At block 504, the processing logic detects, via replay detection logic 122, a retransmission of a timing protocol message (e.g., a PTM message). In one embodiment, the retransmission is retransmission of a PTM request to the responding component 110 via the transmission logic 106. In another embodiment, the retransmission is a retransmission of a PTM response with a data payload (e.g., PTM responseD) from the responding component 110 received via the receiving logic 107. In another embodiment, the retransmission is a retransmission of a PTM response without a data payload from the responding component 110 received via the receiving logic 107.

At block 506, the processing logic sets, via the replay detection logic 122, an internal timing state of the requesting component 105 as invalid in response to the retransmission. Flow reverts to block 506 whenever the requesting component 105 detects a retransmission from the requesting component 105 or the responding component 110. In one embodiment, the processing logic sets, via the replay detection logic 122 an internal timing state of the requesting component 105 as invalid in response to the retransmission of the PTM request to the responding component 110. The requesting component may disregard data payloads of timing protocol responses (e.g., PTM responses) received after the retransmission until at least one timing protocol (e.g., PTM dialog) that does not have errors or retransmissions completes. In another embodiment, the processing logic sets, via the replay detection logic 122, an internal timing state of the requesting component 105 as invalid in response to the retransmission of the PTM response (e.g., PTM response/responseD) from the responding component 110. In another embodiment, the processing logic sets (e.g., via replay detection logic 122) an internal timing state of the requesting component 105 as invalid in response to receiving a PTM response without a data payload from the responding component 110. In another embodiment, the processing logic sets, via the replay detection logic 122, an internal timing state of the requesting component 105 as invalid in response to an error.

At block 508, the processing logic transmits, via the transmission logic 106, a first non-retransmitted timing protocol request (e.g., a first non-retransmitted PTM request) to the responding component 110 via the link 115. In one embodiment, there are no intervening PTM requests sent after the internal timing state of the requesting component 105 is set invalid and before the transmission of the first non-retransmitted PTM request. In another embodiment, there are intervening PTM requests sent after the internal timing state of the requesting component 105 is set invalid and before the transmission of the first non-retransmitted PTM request. The intervening PTM requests may be retransmitted PTM requests.

At block 510, the processing logic receives, via the receiving logic 107, a first non-retransmitted timing protocol response (e.g., a PTM response without a data payload or a PTM response with a data payload (PTM responseD)) from the responding component 110 in response to the first non-retransmitted timing protocol request. In one embodiment, the first non-retransmitted timing protocol request and the first non-retransmitted timing protocol response are a first timing protocol dialog (e.g., first PTM dialog) that completes without errors and retransmissions after the internal timing state of the requesting component is set as invalid.

At block 512, the processing logic transmits, via transmission logic 106 of a requesting component 105, a second non-retransmitted timing protocol request (e.g., second non-retransmitted PTM request) to the responding component 110 via the link 115. In one embodiment, the second non-retransmitted timing protocol request is consecutive to the first non-retransmitted timing protocol request.

At block 514, the processing logic receives, via the receiving logic 107, a second non-retransmitted timing protocol response (e.g., PTM response) from the responding component 110 in response to the second non-retransmitted timing protocol request. In one embodiment, the second non-retransmitted timing protocol request and the second non-retransmitted timing protocol response are a second timing protocol dialog (e.g., second PTM dialog) that completes without errors and retransmissions after the internal timing state of the requesting component is set as invalid. In one embodiment the first non-retransmitted timing protocol response does not have a data payload and the second non-retransmitted timing protocol response has a data payload (e.g., a second non-retransmitted PTM responseD).

At block 516, the processing logic detects, via validation logic 124, the at least two consecutive timing protocol dialogs (e.g., at least two consecutive PTM dialogs). In one embodiment, the processing logic detects, via the validation logic 124, that the at least two consecutive timing protocol dialogs completed without errors and without retransmissions. In another embodiment, the processing logic detects, via validation logic 124, the second non-retransmitted timing protocol response.

At block 518, the processing logic sets, via the validation logic 124, the internal timing state of the requesting component 105 as valid in response to completion of the at least two consecutive timing protocol dialogs. In one embodiment, the processing logic sets the internal timing state as valid is in response to receiving, via the receiving logic 107, the at least two consecutive non-retransmitted timing protocol responses, the last of these responses being a timing protocol response with a data payload (e.g., a PTM responseD). In one embodiment, the processing logic sets, via the validation logic 124, the internal timing state of the requesting component 105 as valid using the timing information in the second non-retransmitted timing protocol response from the responding component 110.

Figure 5B:
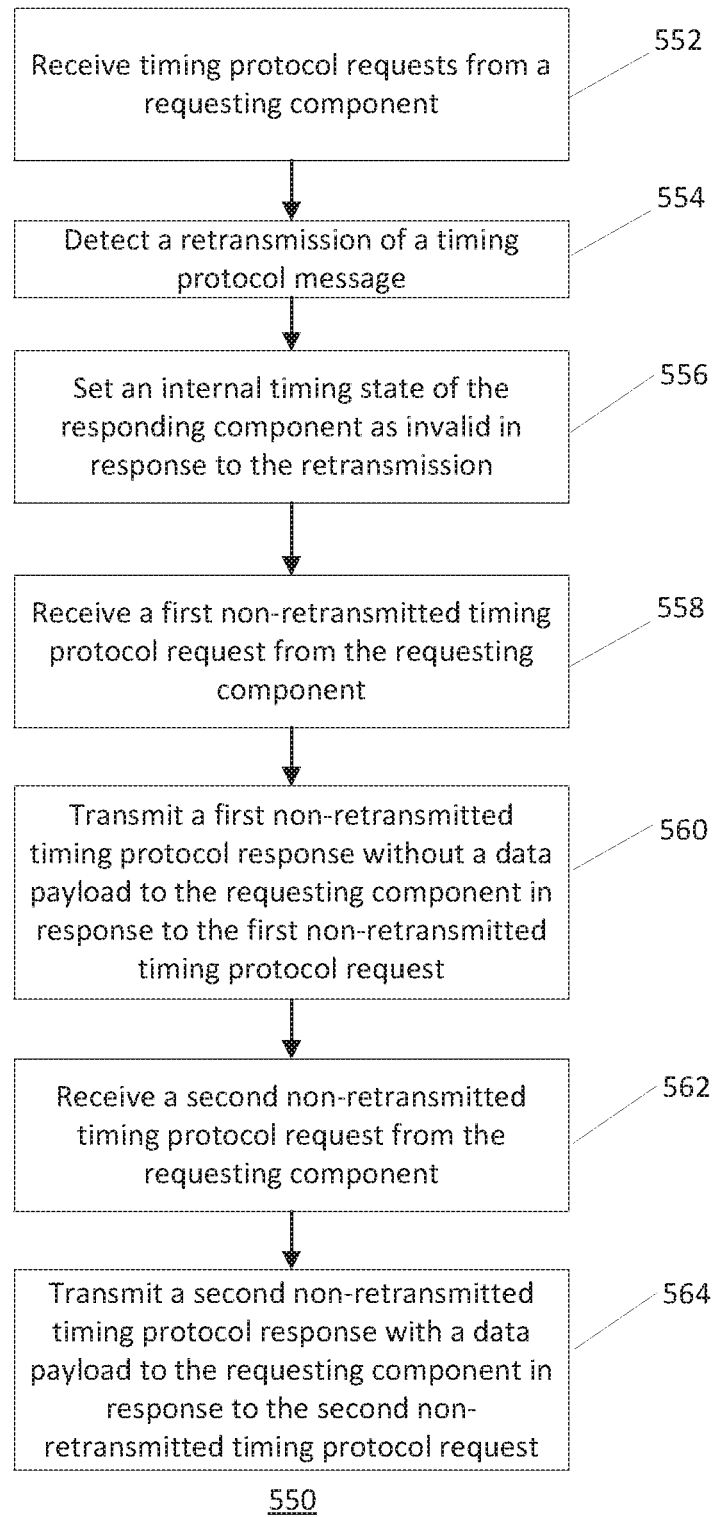
FIG. 5b is a flow diagram of a method of time offset validation of the responding component, according to another embodiment.

FIG. 5b is a flow diagram of a method 550 of time offset validation of the responding component 110 according to one embodiment. Method 550 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 550 may be performed, in part, by processor 305 described above with respect to FIG. 3.

For simplicity of explanation, the method 550 is depicted and described as a series of acts. However, acts in accordance with this disclosure can occur in various orders and/or concurrently and with other acts not presented and described herein. Furthermore, not all illustrated acts may be performed to implement the method 550 in accordance with the disclosed subject matter. In addition, those skilled in the art will understand and appreciate that the method 550 could alternatively be represented as a series of interrelated states via a state diagram or events.

Referring to FIG. 5b, at block 552, the processing logic receives, via receiving logic 111 of a responding component 110, timing protocol requests (e.g., PTM requests) from a requesting component 105 via a link.

At block 554, the processing logic detects, via replay detection logic 132 of the responding component 110, a retransmission of a timing protocol message (e.g., PTM message). In one embodiment, the retransmission is retransmission of a PTM request from the requesting component 105, received via the receiving logic 111. In another embodiment, the retransmission of the PTM message is a retransmission of a PTM response with a data payload (e.g., PTM responseD) to the requesting component 105 by the transmission logic 112. In another embodiment, the retransmission of the PTM message is a retransmission of a PTM response without a data payload to the requesting component 105 by the transmission logic 112.

At block 556, the processing logic sets, via the replay detection logic 132 of the responding component 110, an internal timing state of the responding component 110 as invalid in response to the retransmission. Flow reverts to block 556 whenever the requesting component 105 detects a retransmission from the requesting component 105 or the responding component 110. In one embodiment, processing logic sets, via the replay detection logic 132 of the responding component 110, an internal timing state of the responding component 110 as invalid in response to the retransmission of a PTM request received from the requesting component 110. In another embodiment, the processing logic sets, via the replay detection logic 122, an internal timing state of the responding component 110 as invalid in response to the retransmission of the PTM response (e.g., PTM response/responseD) to the requesting component 105. In another embodiment, the processing logic sets, via the replay detection logic 122, an internal timing state of the requesting component 105 as invalid in response to an error.

At block 558, the processing logic receives a first non-retransmitted timing protocol request (e.g., first non-retransmitted PTM request) from the requesting component 105 via the link. In one embodiment, there are no intervening timing protocol requests received after the internal timing state of the responding component 110 is set invalid and before receiving the first non-retransmitted timing protocol request. In another embodiment, there are intervening timing protocol requests received after the internal timing state of the responding component 110 is set as invalid and before receiving the first non-retransmitted timing protocol request. The intervening timing protocol requests may be retransmitted timing protocol requests (e.g., retransmitted PTM requests).

At block 560, the processing logic transmits, via the transmission logic 112, a first non-retransmitted timing protocol response (e.g., first non-retransmitted PTM response) without a data payload to the requesting component 105 in response to the first non-retransmitted timing protocol request. In one embodiment, the first non-retransmitted timing protocol request and the first non-retransmitted timing protocol response are a first timing protocol dialog (e.g., first PTM dialog) that completes without errors and retransmissions after the internal timing state of the requesting component is set as invalid.

At block 562, the processing logic receives a second non-retransmitted timing protocol request (e.g., PTM request) from the requesting component 105. In one embodiment, the second non-retransmitted timing protocol request is consecutive to the first non-retransmitted timing protocol request.

At block 564, the processing logic transmits, via the transmission logic 112, a second non-retransmitted timing protocol response with a data payload (e.g., a PTM responseD) to the requesting component 105 in response to the second non-retransmitted timing protocol request. The second non-retransmitted timing protocol request and the second non-retransmitted timing protocol response are a second timing protocol dialog (e.g., second PTM dialog) that completes without errors and retransmissions after the internal timing state of the requesting component is set as invalid. The first timing protocol dialog and the second timing protocol dialog may be consecutive. In one embodiment, the processing logic detects, via the validation logic 134, the at least two consecutive timing protocol dialogs (e.g., at least two consecutive PTM dialogs) and sets, via the validation logic 134, the internal timing state of the responding component 110 as valid in response to completion of the at least two consecutive timing protocol dialogs. In another embodiment, processing logic sets, via the validation logic 134, the internal timing state of the responding component 110 as valid in response to completion of the at least two consecutive timing protocol dialogs without errors, without retransmissions, and so forth.

Figure 6A:
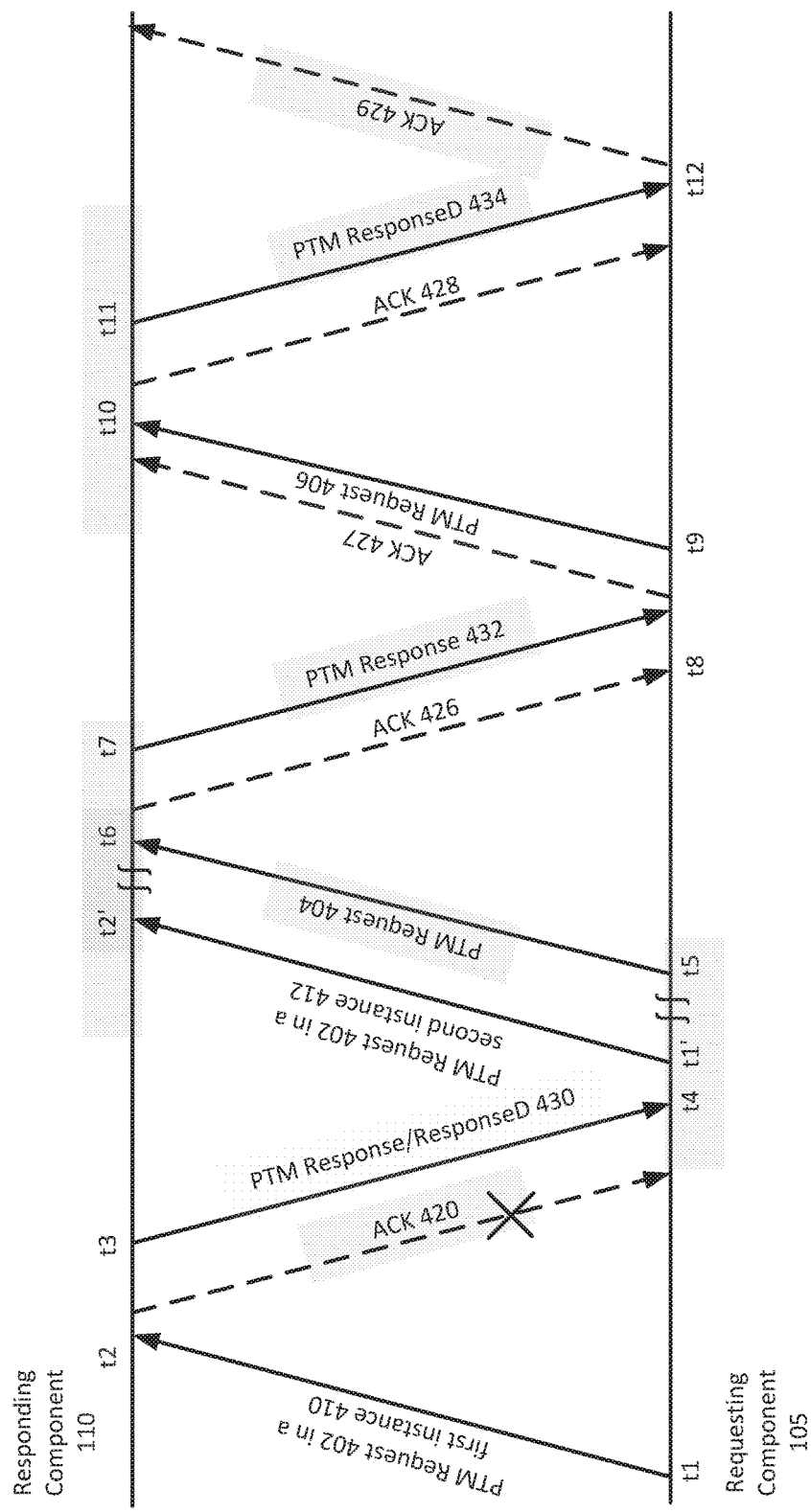
FIG. 6a illustrates transmission of PTM messages between the requesting component and the responding component, according to another embodiment.

FIG. 6a illustrates transmission of PTM messages between the requesting component 105 and the responding component 110, according to another embodiment.

Requesting component 105 sends a PTM request 402 in a first instance 410 and responding component 110 transmits a PTM response/responseD 430 (e.g., a PTM response or a PTM responseD, a PTM response with or without a data payload) in response to receiving PTM request 402 in the first instance 410. In response to requesting component 105 not receiving an ACK 420 that is not observed as corrupted before a corresponding timeout period expires (e.g., receiving a NAK, receiving an ACK that is observed as corrupted, and so forth) requesting component 105 retransmits PTM request 402 in a second instance 412 which responding component 110 receives.

In one embodiment, requesting component 105 detects the retransmission of PTM request 402 in a second instance 412 to the responding component 110. The requesting component 105 may set an internal timing state of the requesting component 105 as invalid in response to the retransmission.

In response to the internal timing state of the requesting component 105 being set as invalid, the requesting component 105 may send PTM requests (e.g., PTM request 404 and PTM request 406) until the completion of two PTM dialogs without error and without retransmissions (e.g., requesting component 105 transmits two consecutive non-retransmitted PTM requests (a first non-retransmitted PTM request 404 and a second non-retransmitted PTM request 406) and receives a PTM response 432 and a PTM responseD (a second non-retransmitted PTM responseD 434 in response to the second non-retransmitted PTM request 406)).

The requesting component 105 may detect the two PTM dialogs (e.g., PTM request 404 and PTM response 432 being a first PTM dialog, PTM request 406 and PTM responseD 434 being a second PTM dialog) completed without error (e.g., consecutively, without a retransmitting a PTM message). The requesting component 105 may set the internal timing state of the requesting component 105 as valid using timing information in the second non-retransmitted PTM responseD.

In another embodiment, responding component detects the retransmission of a PTM request 402 in a second instance 412 from the requesting component 105. The responding component 110 may set an internal timing state of the responding component 110 as invalid in response to the retransmission.

In response to the internal timing state of the responding component 110 being set as invalid, the responding component 110 may send PTM responses (e.g., PTM response 432 and PTM response 434) without a data payload (e.g., without a timestamp, without master clock time) in response to PTM requests received from the requesting component 105 until the responding component 110 receives a second non-retransmitted PTM request (e.g., PTM request 406) consecutive to a first non-retransmitted PTM request (e.g., PTM request 404).

The responding component 110 may detect the two PTM dialogs (e.g., PTM request 404 and PTM response 432 being a first PTM dialog, PTM request 406 and PTM responseD 434 being a second PTM dialog) completed without error (e.g., consecutively, without a retransmitting a PTM message). In one embodiment, the responding component 110 may set the internal timing state of the responding component 110 as valid in response to the two PTM dialogs completed without error. In another embodiment, the responding component 110 may set the internal timing state of the responding component 110 as valid in response to transmitting the second non-retransmitted PTM responseD.

Figure 6B:
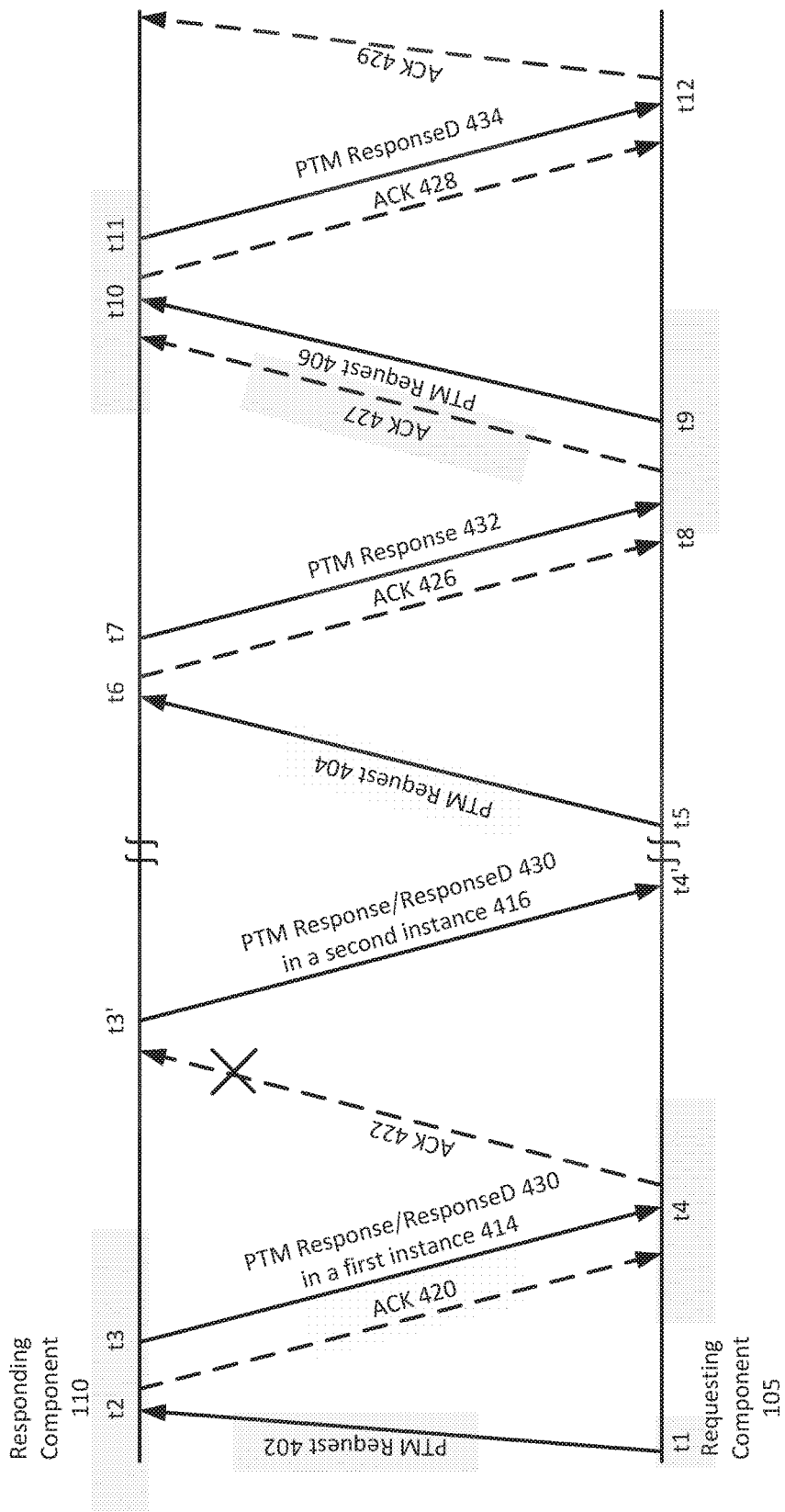
FIG. 6b illustrates transmission of PTM messages between the requesting component and the responding component, according to another embodiment.

FIG. 6b illustrates transmission of PTM messages between the requesting component 105 and the responding component 110, according to another embodiment.

Requesting component 105 sends a PTM request 402 and responding component 110 sends a PTM response/responseD 430 in a first instance 414. Responding component 110 does not receive an ACK 422 that is not observed as corrupted from requesting component 105 (in response to receiving the PTM response/responseD 430 in a first instance 414) before a corresponding timeout period and responding component 110 retransmits PTM response/responseD 430 in a second instance 416 which requesting component 105 receives.

In one embodiment, responding component detects the retransmission of a PTM response 430 in a second instance 416. The responding component 110 may set an internal timing state of the responding component 110 as invalid in response to the retransmission.

In response to the internal timing state of the responding component 110 being set as invalid, the responding component 110 may send PTM responses (e.g., PTM response 432 and PTM response 434) without a data payload (e.g., without a timestamp, without master clock time) in response to each PTM request received (after the internal timing state is set as invalid) until the responding component 110 receives two consecutive non-retransmitted PTM requests (e.g., PTM requests 404 and 406)

The responding component 110 may detect the two PTM dialogs (e.g., PTM request 404 and PTM response 432 being a first PTM dialog, PTM request 406 and PTM responseD 434 being a second PTM dialog) completed without error (e.g., consecutively, without a retransmitting a PTM message). In one embodiment, the responding component 110 may set the internal timing state of the responding component 110 as valid in response to the two PTM dialogs completed without error. In another embodiment, the responding component 110 may set the internal timing state of the responding component 110 as valid in response to transmitting the second non-retransmitted PTM responseD.

In another embodiment, requesting component 105 detects the retransmission of PTM response 430 in a second instance 416 to the requesting component 105. The requesting component 105 may set an internal timing state of the requesting component 105 as invalid in response to the retransmission.

In another embodiment, requesting component 105 detects the transmission of PTM response without a data payload. The requesting component 105 may set an internal timing state of the requesting component 105 as invalid in response to detecting the transmission of a PTM response without a data payload.

In response to the internal timing state of the requesting component 105 being set as invalid, the requesting component 105 may send PTM requests (e.g., PTM request 404 and PTM request 406) until it transmits two consecutive non-retransmitted PTM requests (a first non-retransmitted PTM request 404 and a second non-retransmitted PTM request 406) and receives a PTM responseD (a second non-retransmitted PTM responseD 434 in response to the second non-retransmitted PTM request 406).

The requesting component 105 may detect the two PTM dialogs (e.g., PTM request 404 and PTM response 432 being a first PTM dialog, PTM request 406 and PTM responseD 434 being a second PTM dialog) completed without error (e.g., consecutively, without a retransmitting a PTM message). The requesting component 105 may set the internal timing state of the requesting component 105 as valid using timing information in the second non-retransmitted PTM responseD.

Figure 7:
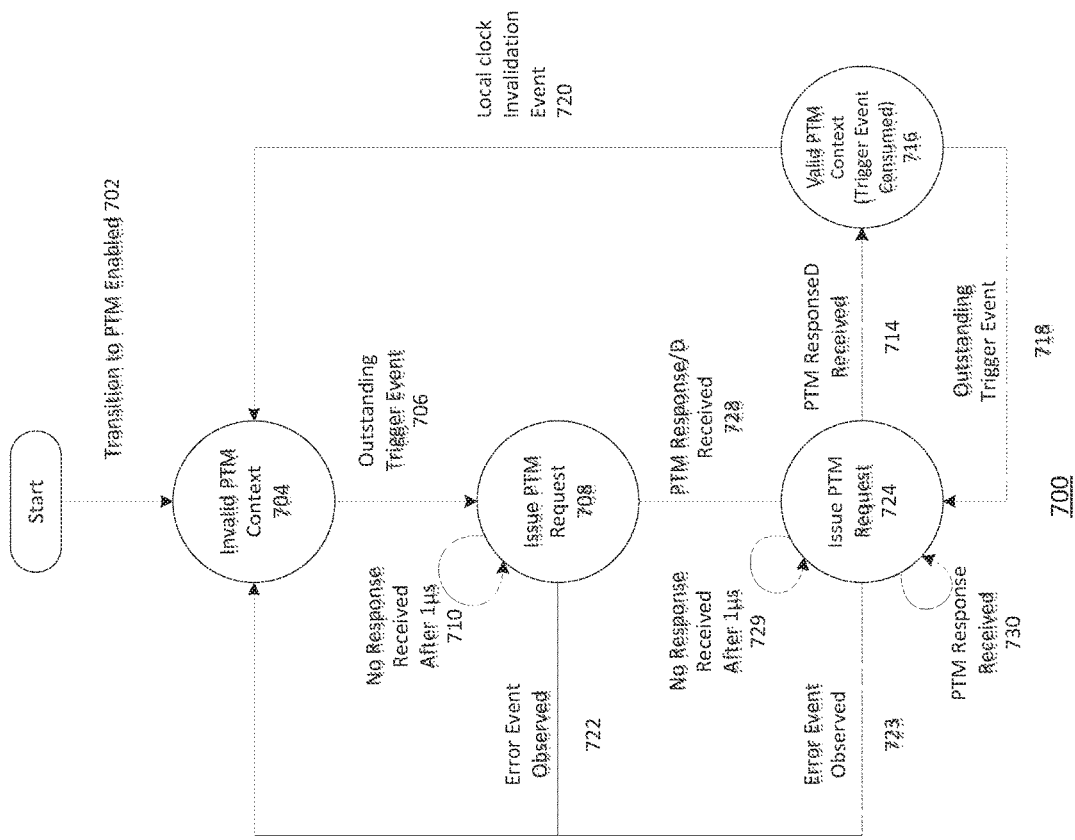
FIG. 7 is a flow diagram of a method of time offset validation of the requesting component, according to another embodiment.

FIG. 7 is a flow diagram of a method 700 of time offset validation of the requesting component 105, according to another embodiment. Method 700 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 550 may be performed, in part, by processor 305 described above with respect to FIG. 3.

For simplicity of explanation, the method 700 is depicted and described as a series of acts. However, acts in accordance with this disclosure can occur in various orders and/or concurrently and with other acts not presented and described herein. Furthermore, not all illustrated acts may be performed to implement the method 700 in accordance with the disclosed subject matter. In addition, those skilled in the art will understand and appreciate that the method 700 could alternatively be represented as a series of interrelated states via a state diagram or events.

At 702, transition to PTM protocol is enabled.

At block 704, the processing logic determines an invalid PTM context (e.g., the internal timing state of the requesting component 105 is invalid). In one embodiment, block 704 is the initial state of the requesting component 105. The initial state of the PTM context of a requesting component 105 may always be invalid because there is no time information from the responding component 110 with which to construct a valid PTM context. In another embodiment, the internal timing state of the requesting component 105 is invalid in response to the retransmission of a PTM message. In another embodiment, the internal timing state of the requesting component 105 is invalid in response to a link reset event or a link retraining event. In another embodiment, the internal timing state of the requesting component 105 is invalid in response to the link being reset in response to the link having a data link layer down (DL_Down) event which causes link layer 210, transaction layer 205, and so forth to not be able to communicate. In another embodiment, the internal timing state of the requesting component 105 is invalid in response to physical layer 220 not being able to communicate.

At 706, an outstanding trigger event occurs. In one embodiment, the outstanding trigger event is hardware of the requesting component 105 determining that a threshold amount of time has passed since the previous successful PTM dialog. In another embodiment, the outstanding trigger event is software determining that a threshold amount of time has passed since the previous successful PTM dialog.

At block 708, processing logic issues a PTM request to the responding component 110. In one embodiment, the processing logic transmits the PTM request in a first instance. In another embodiment, the processing logic retransmits the PTM request in a second instance. In one embodiment, the processing logic transmits the first non-retransmitted PTM request.

At 710, no response is received before expiration of a timeout period (e.g., one microsecond) and flow continues to block 708. In one embodiment, the requesting component 105 does not receive an ACK in response to the PTM request in a first instance before expiration of a timeout period and the requesting component retransmits the PTM request in a second instance. In another embodiment, the requesting component 105 does not receive a PTM response/responseD in response to the PTM request before expiration of a timeout period and the requesting component transmits a new non-retransmitted PTM request.

At 728, a PTM response/responseD is received in response to a PTM request. An ACK that is not observed as corrupted may be received in response to the PTM request before the corresponding timeout period expires. In one embodiment, a PTM response without a data payload may be received in response to the internal timing of the responding component 110 being invalid. The PTM response/responseD may be a first non-retransmitted PTM response and a first PTM dialog may include the first non-retransmitted PTM request and the first non-retransmitted PTM response.

At block 724, processing logic issues a PTM request to the responding component 110. In one embodiment, the processing logic transmits a second non-retransmitted PTM request.

At 729, no response is received before expiration of a timeout period (e.g., one microsecond) and flow continues to block 724. In one embodiment, the requesting component 105 does not receive an ACK in response to the PTM request in a first instance before expiration of a timeout period and the requesting component retransmits the PTM request in a second instance. In another embodiment, the requesting component 105 does not receive a PTM response/responseD in response to the PTM request before expiration of a timeout period and the requesting component transmits a new non-retransmitted PTM request.

At 722 and 723, an error event is observed and flow continues to block 704. In one embodiment, observing the error event includes the detecting the retransmission of a PTM request (e.g., PTM request 402 in a second instance 412). In another embodiment, observing the error event includes detecting the retransmission of a PTM response/responseD (e.g., PTM response/responseD 430 in a second instance 416). The retransmission may be caused by receiving a NAK, receiving an ACK that is observed as corrupted, or not receiving an ACK that is not observed as corrupted before the timeout period expires.

At 730, a PTM response is received in response to a PTM request. In one embodiment, a PTM response without a data payload may be received in response to the internal timing of the responding component 110 being invalid. In another embodiment, the PTM response without a data payload may be received in response to not having transmitted at least two consecutive non-retransmitted PTM requests without errors since the internal timing of the requesting component 105 was set as invalid. The PTM response may be a first non-retransmitted PTM response and a first PTM dialog may include the first non-retransmitted PTM request and the first non-retransmitted PTM response.

At 714, the processing logic receives a PTM responseD (a PTM response with a data payload) in response to a PTM request and flow continues to block 716. An ACK that is not observed as corrupted may be received in response to a PTM request before the corresponding timeout period expires. In one embodiment, the PTM responseD is received in response to the internal timing state of the responding component 110 being valid. In another embodiment, the PTM responseD is a second non-retransmitted PTM response and a second PTM dialog may include the second non-retransmitted PTM request and the second non-retransmitted PTM response.

At block 716, processing logic validates the PTM context (e.g., sets the internal timing state as valid) of the requesting component 105, resolves the condition that initiated the trigger event and marks the trigger event as being consumed. In one embodiment, the trigger event being consumed is the requesting component 105 receiving a PTM responseD (PTM response with a data payload) that is not observed as corrupted before a corresponding timeout period expires.

At 718, an outstanding trigger event occurs and flow continues to block 708 to issue a PTM request. In one embodiment, the outstanding trigger event is hardware of the requesting component 105 determining that a threshold amount of time has passed since the previous successful PTM dialog. In another embodiment, the outstanding trigger event is software determining that a threshold amount of time has passed since the previous successful PTM dialog.

At 720, a local clock invalidation event occurs and flow continues to block 704. In one embodiment, local clock invalidation event is when the requesting component 105 entered a low power state in which the local clocks of the requesting component 105 were disabled. Once normal operation is resumed (e.g., the local clocks of the requesting component are enabled), a new pair of consecutive successful PTM dialogs when the second dialog includes a PTM responseD (e.g., issue PTM request 708, PTM response/responseD received 728, issue PTM request 724, and PTM responseD received 714) would be required to restore a valid PTM context (e.g., internal timing state; Valid PTM context 716).

FIG. 8 is a flow diagram of a method 800 of time offset validation of the responding component 110, according to another embodiment. Method 800 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 550 may be performed, in part, by processor 305 described above with respect to FIG. 3.

For simplicity of explanation, the method 800 is depicted and described as a series of acts. However, acts in accordance with this disclosure can occur in various orders and/or concurrently and with other acts not presented and described herein. Furthermore, not all illustrated acts may be performed to implement the method 800 in accordance with the disclosed subject matter. In addition, those skilled in the art will understand and appreciate that the method 800 could alternatively be represented as a series of interrelated states via a state diagram or events.

At 802, transition to PTM protocol is enabled.

At block 804, the processing logic determines an invalid PTM context (e.g., the internal timing state of the responding component 110 is invalid). In one embodiment, block 804 is the initial state of the responding component 110. The initial state of the PTM context of responding component 110 may always be invalid in response to the responding component 110 not having historic timestamps (e.g., t2, t3-t2 parts of the data payload) because there have not been any PTM dialogs at this point. In another embodiment, the internal timing state of the requesting component 105 is invalid in response to the retransmission of a PTM message. In another embodiment, the internal timing state of the requesting component 105 is invalid in response to a link reset event or a link retraining event. In another embodiment, the internal timing state of the requesting component 105 is invalid in response to the link being reset in response to the link having a data link layer down (DL_Down) event which causes link layer 210, transaction layer 205, and so forth to not be able to communicate. In another embodiment, the internal timing state of the requesting component 105 is invalid in response to physical layer 220 not being able to communicate.

At 812, a PTM request is received. In one embodiment, the PTM request is a first non-retransmitted PTM request.

At block 806, responding component 110 issues a PTM response (e.g., at t3) without a data payload in response to the PTM request. In one embodiment, PTM response is a first non-retransmitted PTM response in response to the first non-retransmitted PTM request. The first non-retransmitted PTM request and the first non-retransmitted PTM response may be a first PTM dialog.

At 814, a PTM request is received. In one embodiment, the PTM request is a second non-retransmitted PTM request.

At block 810, a PTM responseD is issued. In one embodiment, the PTM responseD is a second non-retransmitted PTM responseD in response to the second non-retransmitted PTM request. The second non-retransmitted PTM request and the second non-retransmitted PTM responseD may be a second PTM dialog. In response to issuing the PTM responseD, the internal timing state of the responding component 110 may be set as valid.

At 820, a PTM request is received. Once the responding component 110 is at block 810, the responding component 110 can continue to issue a PTM responseD whenever the responding component 110 receives a new PTM request.

At 816 and 817, an error event is observed and flow continues to block 804. In one embodiment, observing the error event includes the detecting the retransmission of a PTM request (e.g., PTM request 402 in a second instance 412). In another embodiment, observing the error event includes detecting the retransmission of a PTM response/responseD (e.g., PTM response/responseD 430 in a second instance 416). In another embodiment, the error may not be related to retransmission of a PTM message.

At 818 and 819, a local clock invalidation event occurs and flow continues to block 804. In one embodiment, local clock invalidation event is when the responding component 110 entered a low power state in which the local clocks of the responding component 110 were disabled. Once normal operation is resumed (e.g., the local clocks of the responding component 110 are enabled), a new PTM dialog would be required to restore a valid PTM context (e.g., internal timing state).

Figure 9A:
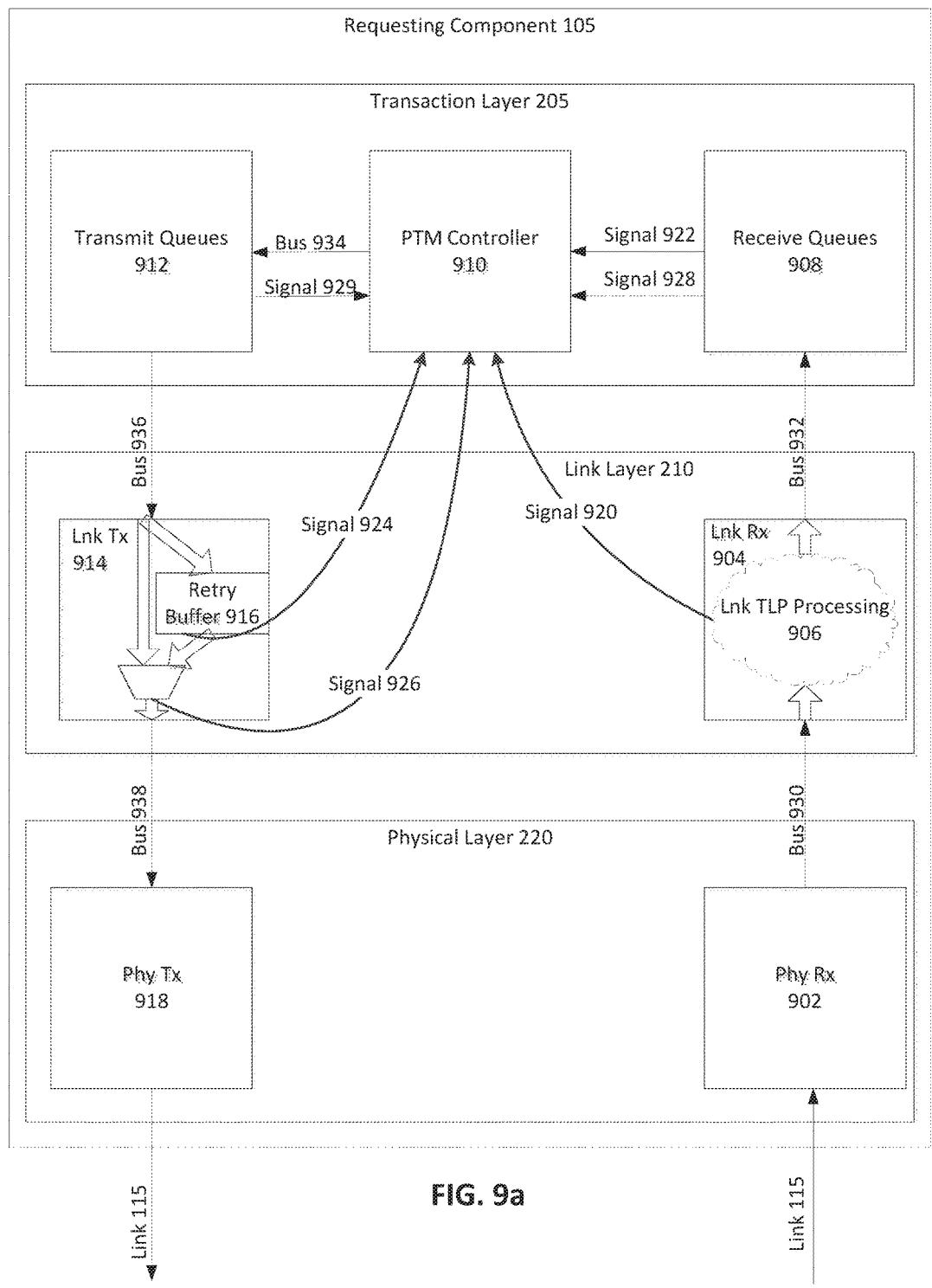
FIG. 9a illustrates a block diagram of a requesting component, according to one embodiment.

FIG. 9a illustrates a block diagram of a requesting component 110, according to one embodiment. Requesting component 110 includes transaction layer 205, link layer 210, and physical layer 220.

Transaction layer 205 includes receive queues 908, PTM controller 910, and transmit queues 912. Receive queues 908 may be receive queues logic, PTM controller 910 may be PTM controller logic, and transmit queues 912 may be transmit queues logic.

Link layer 210 includes Lnk Rx 904 and Lnk Tx 914. Lnk Rx 904 includes Lnk TLP processing 906. Lnk Tx 914 includes retry buffer 916. Lnk Rx 904 may be Lnk Rx logic, Lnk Tx 914 may be Lnk Tx logic, Lnk TLP processing 906 may be Lnk TLP processing logic, and retry buffer 916 may be retry buffer logic.

Physical layer 220 includes Phy Tx 918 (e.g., transmission logic 106) and Phy Rx 902 (e.g., receiving logic 107). Phy Tx 918 and Phy Rx 902 are coupled with responding component 110 by link 115.

In one embodiment, PTM controller 910 includes replay detection logic 132. In another embodiment, Lnk TLP processing 906 includes replay detection logic. In another embodiment, retry buffer 916 includes replay detection logic. In one embodiment PTM controller 910 includes validation logic 134.

Phy Rx 902 is connected to Lnk Rx 904 by bus 930. Lnk Rx 904 is connected to receive queues 908 by bus 932. PTM controller 910 is connected to transmit queues 912 by bus 934. Transmit queues 912 is connected to Lnk Tx 914 by bus 936. Lnk Tx 914 is connected to Phy Tx 918 by bus 938.

Lnk Rx 904 may transmit a signal 920 to PTM controller 910. Receive queues 908 may transmit a signal 922 and a signal 928 to PTM controller 910. Lnk Tx 914 may transmit a signal 924 to PTM controller 910. Retry buffer 916 may transmit a signal 926 to PTM controller 910. Transmit Queues 912 may transmit a signal 929 to PTM controller 910.

Requesting component 105 receives a PTM response/responseD from responding component 110 at Phy Rx 902. Phy Rx transmits the PTM response/responseD to Lnk Rx 904 via bus 930.

In one embodiment, Lnk TLP processing 906 determines if the PTM response/responseD is a duplicate PTM response/responseD (e.g., if it has been retransmitted, if it has a sequence number of a PTM response/responseD that was already acknowledged by requesting component 105).

If the PTM response/responseD is a duplicate, Lnk Rx sends a signal 920 to PTM controller 910 indicating that a duplicate PTM message has been received and to invalidate timestamps (e.g., set the internal timing state of requesting component 110 as invalid).

In another embodiment, Lnk TLP processing 906 transmits the PTM response/responseD to receive queues 908 over bus 932 and receive queues 908 determines if the PTM response/responseD does not have a data payload (e.g., is a PTM response). If the PTM response/responseD does not have a data payload (e.g., is a PTM response), receive queues 908 sends a signal 922 to PTM controller 910 indicating that a PTM response without a data payload has been received and to invalidate timestamps (e.g., set the internal timing state of requesting component 110 as invalid). If the PTM response/responseD does have a data payload (e.g., is a PTM responseD), receive queues 908 sends a signal 922 to PTM controller 910 indicating that a PTM responseD with a data payload has been received and to validate or maintain valid timestamps (e.g., set the internal timing state of requesting component 110 as valid, not set the internal timing state as invalid).

In another embodiment, if Lnk TLP processing 906 determines the PTM response/responseD is a PTM responseD, Lnk Rx 904 transmits the PTM responseD to receive queues 908 over bus 932 and the receive queues 908 captures the timestamp (e.g., t4) of the PTM responseD and sends a signal 928 to PTM controller 910 with the timestamp of the PTM responseD.

In another embodiment, if Lnk TLP processing 906 determines the PTM message is a PTM responseD (e.g., has a data payload) that is not a duplicate, Lnk Rx 904 transmits the PTM responseD to receive queues 908 over bus 932 and the receive queues 908 captures the timestamp (e.g., t4) of the PTM responseD and sends a signal 928 to PTM controller 910 with the timestamp of the PTM responseD.

PTM controller transmits a PTM request to transmit queues 912 over bus 934. PTM controller may transmit a PTM request in response to a trigger event (e.g., a determination that a threshold amount of time has passed since the previous successful PTM dialog, a request from software, etc.). Transmit queues 912 captures the timestamp (e.g., t5) of transmission of the PTM request and may transmit a signal 929 to PTM controller 910 with the timestamp. Transmit queues 912 transmits the PTM request to Lnk Tx 914 over bus 936. Lnk Tx 914 transmits a signal 926 to PTM controller 910 indicating the PTM request has been sent. Lnk Tx 914 transmits the PTM request to Phy Tx 918 over bus 938. Phy Tx 918 transmits PTM request to the responding component 110 over link 115.

Requesting component 105 may receive an ACK acknowledging the responding component 110 received a PTM request that was not observed as corrupted before a corresponding timeout period expired in response to a PTM response/responseD. If requesting component 105 does not receive an ACK before a corresponding timeout period expires (e.g., requesting component 105 receives a NAK, requesting component 105 receives an ACK that is observed as corrupted, and so forth), retry buffer 916 may retransmit the PTM request in a second instance (e.g., PTM request 402 in a second instance 412 in FIG. 4a and FIG. 6a). Upon retransmitting PTM request in a second instance, retry buffer 916 may send a signal 924 to PTM controller to invalidate timestamps (e.g., set the internal timing state as invalid). Requesting component 105 may send an ACK to the responding component 110 when it receives a PTM response/responseD from the responding component 110.

If the internal timing state of the requesting component 105 is set as invalid, once at least two consecutive PTM dialogs without errors and without retransmissions have completed (the second of which completes with PTM responseD), the requesting component 105 may set the internal timing state of the requesting component 105 as valid.

Requesting component 105 may include transmission means for transmitting timing protocol requests to a responding component via a link. In one embodiment the transmission means includes transmission logic 106. In another embodiment, transmission means includes Phy Tx 918.

Requesting component 105 may include receiving means for receiving timing protocol responses from the responding component via the link in response to the timing protocol requests. In one embodiment the receiving means includes receiving logic 107. In another embodiment the receiving means includes Phy Rx 902.

In another embodiment, one or more of the transmission means of requesting component 105 or the receiving means of requesting component 105 includes one or more of physical layer 220, logical sub block 221, electrical sub-block 222, a transmission path (e.g., transmission line, a copper line, an optical line, a wireless communication channel, an infrared communication link, or other communication path), a link, a transmission medium, an interconnect, a point-to-point communication channel, a PCIe® port, a lane, low-speed peripherals (e.g., a card using the 802.11 Wi-Fi® technology), a graphics adapter, FSB 306, a serial point-to-point interconnect, a serial differential interconnect architecture, controller hub 315, a root hub, root complex, root controller, a chipset, a MCH, a northbridge, an interconnect controller hub (ICH) a southbridge, a root controller/hub, switch/bridge 320, input/output modules 317 or 321, interfaces/ports 317 or 321, internal or external device or component to be coupled to an electronic system (e.g., I/O device, NIC, add-in card, audio processor, network processor, hard-drive, storage device, CD/DVD ROM, monitor, printer, mouse, keyboard, router, portable storage device, Firewire device, USB device, scanner, and so forth), graphics accelerator 330, short range wireless engines (e.g., WLAN unit), one or more add-in cards, NGFF connectors, a motherboard, a unit using Wi-Fi® technology or Bluetooth® technology, a USB link, a UART link, display engine 1012, an integrated memory controller 1020, direct media interface (DMI) 1016, PCIe® interfaces 1014 (e.g., PCIe® Graphics (PEG) port interfaces for PEG adapters), PCIe® bridge 1018, equivalents thereof, and so forth.

Requesting component 105 may include replay detection means for detecting a retransmission of a timing protocol message and for setting an internal timing state of the requesting component as invalid in response to the retransmission, wherein the timing protocol message comprises at least one of a timing protocol request or a timing protocol response. In one embodiment, replay detection means includes replay detection logic 122. In another embodiment, replay detection means includes PTM controller 910. In another embodiment, replay detection means includes Lnk TLP processing 906. In another embodiment, replay detection means includes retry buffer 916.

Requesting component 105 may include validation means for detecting at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation means is for setting the internal timing state of the requesting component as valid in response to completion of the at least two consecutive timing protocol dialogs. In one embodiment, validation means includes validation logic 124. In another embodiment, validation means includes PTM controller 910.

The responding component 110 may have a configuration similar to the requesting component 105.

Figure 9B:
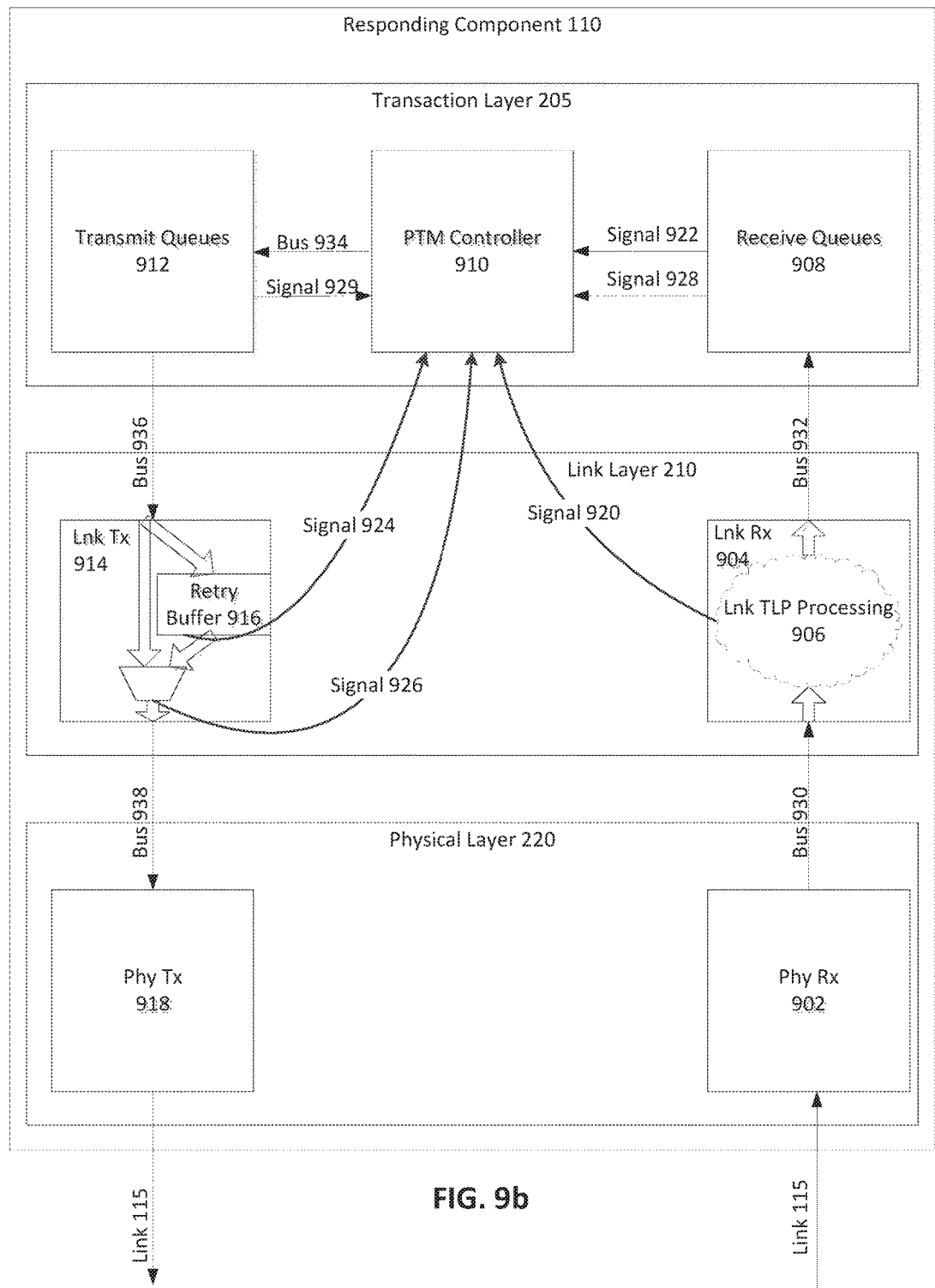
FIG. 9b illustrates a block diagram of a responding component, according to one embodiment.

FIG. 9b illustrates a block diagram of a responding component 110, according to one embodiment. Responding component 110 includes transaction layer 205, link layer 210, and physical layer 220. Receive queues 908 may be receive queues logic, PTM controller 910 may be PTM controller logic, and transmit queues 912 may be transmit queues logic.

Transaction layer 205 includes receive queues 908, PTM controller 910, and transmit queues 912. Lnk Rx 904 may be Lnk Rx logic, Lnk Tx 914 may be Lnk Tx logic, Lnk TLP processing 906 may be Lnk TLP processing logic, and retry buffer 916 may be retry buffer logic.

Link layer 210 includes Lnk Rx 904 and Lnk Tx 914. Lnk Rx 904 includes Lnk TLP processing 906. Lnk Tx 914 includes retry buffer 916.

Physical layer 220 includes Phy Tx 918 (e.g., transmission logic 112) and Phy Rx 902 (e.g., receiving logic 111). Phy Tx 918 and Phy Rx 902 are coupled with requesting component 105 by link 115.

In one embodiment, PTM controller 910 includes replay detection logic 132. In another embodiment, Lnk TLP processing 906 includes replay detection logic 132. In another embodiment, retry buffer 916 includes replay detection logic 132. In one embodiment PTM controller 910 includes validation logic 134.

Phy Rx 902 is connected to Lnk Rx 904 by bus 930. Lnk Rx 904 is connected to receive queues 908 by bus 932. PTM controller 910 is connected to transmit queues 912 by bus 934. Transmit queues 912 is connected to Lnk Tx 914 by bus 936. Lnk Tx 914 is connected to Phy Tx 918 by bus 938.

Lnk Rx 904 may transmit a signal 920 to PTM controller 910. Receive queues 908 may transmit a signal 922 and a signal 928 to PTM controller 910. Lnk Tx 914 may transmit a signal 924 to PTM controller 910. Retry buffer 916 may transmit a signal 926 to PTM controller 910. Transmit Queues 912 may transmit a signal 929 to PTM controller 910.

Responding component 110 receives a PTM request from requesting component 105 at Phy Rx 902. Phy Rx transmits the PTM request to Lnk Rx 904 via bus 930. Lnk TLP processing 906 determines if the PTM request is a duplicate PTM request (e.g., if it has been retransmitted, if it has a sequence number of a PTM request that was already acknowledged by responding component 110). If the PTM request is a duplicate, Lnk Rx sends a signal 920 to PTM controller 910 indicating that a duplicate PTM message has been received and to invalidate timestamps (e.g., set the internal timing state as invalid). If the PTM request is not a duplicate, Lnk Rx 904 transmits the PTM request to receive queues 908 over bus 932 and the receive queues 908 captures the timestamp (e.g., t2) of the PTM request and sends a signal 928 to PTM controller 910 with the timestamp of the PTM request.

In one embodiment, if the PTM request is a duplicate, the transaction layer 205 (e.g., PTM controller 910) does not generate a PTM response. In another embodiment, if the PTM request is not a duplicate and if the internal timing state is valid, PTM controller 910 transmits a PTM responseD with a data payload to transmit queues 912 over bus 934. In another embodiment, if the PTM request is received when the internal timing state is invalid and the PTM request is not a second consecutive non-retransmitted PTM request, PTM controller 910 transmits a PTM response without a data payload to transmit queues 912 over bus 934. In another embodiment, if the internal timing state was invalid prior to receiving the PTM request and the PTM request is a second consecutive non-retransmitted PTM request, the internal timing state is set as valid upon reception of the PTM request (e.g., the second consecutive non-retransmitted PTM request) and PTM controller 910 transmits a PTM responseD with a data payload to transmit queues 912 over bus 934.

Transmit queues 912 captures the timestamp (e.g., t3) of transmission of the PTM response/responseD and may transmit a signal 929 to PTM controller 910 with the timestamp. Transmit queues 912 transmits the PTM response/responseD to Lnk Tx 914 over bus 936. Lnk Tx 914 transmits a signal 926 to PTM controller 910 indicating the PTM request has been sent. Lnk Tx 914 transmits the PTM response/responseD to Phy Tx 918 over bus 938. Phy Tx 918 transmits PTM response/responseD to the requesting component over link 115.

Responding component 110 may receive an ACK acknowledging the requesting component 105 received a PTM response/responseD that was not observed as corrupted before a corresponding timeout period expired in response to a PTM request. If responding component 110 does not receive an ACK before a corresponding timeout period expires, retry buffer 916 may retransmit the PTM response/responseD in a second instance (e.g., PTM response/D 430 in a second instance 416 in FIG. 4b and FIG. 6b). If responding component 110 receives a NAK, retry buffer 916 may retransmit the PTM response/responseD in a second instance (e.g., PTM response/D 430 in a second instance 416 in FIG. 4b and FIG. 6b). Upon retransmitting PTM response/responseD in a second instance, retry buffer 916 may send a signal 924 to PTM controller to invalidate timestamps (e.g., set the internal timing state as invalid). Responding component 110 may send an ACK to the requesting component 105 when it receives a PTM request from the requesting component 105.

If the internal timing state of the responding component 110 is set as invalid, once at least two consecutive PTM dialogs without errors and without retransmissions have completed, the responding component 110 may set the internal timing state of the responding component as valid.

The responding component 110 may include receiving means for receiving timing protocol requests from a requesting component via a link. In one embodiment the receiving means includes receiving logic 111. In another embodiment the receiving means includes Phy Rx 902.

The responding component 110 may include transmission means for transmitting timing protocol responses to the requesting component via the link in response to the timing protocol requests. In one embodiment the transmission means includes transmission logic 112. In another embodiment, transmission means includes Phy Tx 918.

In another embodiment, one or more of the transmission means of responding component 110 or the receiving means of responding component 110 includes one or more of physical layer 220, logical sub block 221, electrical sub-block 222, a transmission path (e.g., transmission line, a copper line, an optical line, a wireless communication channel, an infrared communication link, or other communication path), a link, a transmission medium, an interconnect, a point-to-point communication channel, a PCIe® port, a lane, low-speed peripherals (e.g., a card using the 802.11 Wi-Fi® technology), a graphics adapter, FSB 306, a serial point-to-point interconnect, a serial differential interconnect architecture, controller hub 315, a root hub, root complex, root controller, a chipset, a MCH, a northbridge, an interconnect controller hub (ICH) a southbridge, a root controller/hub, switch/bridge 320, input/output modules 317 or 321, interfaces/ports 317 or 321, internal or external device or component to be coupled to an electronic system (e.g., I/O device, NIC, add-in card, audio processor, network processor, hard-drive, storage device, CD/DVD ROM, monitor, printer, mouse, keyboard, router, portable storage device, Firewire device, USB device, scanner, and so forth), graphics accelerator 330, short range wireless engines (e.g., WLAN unit), one or more add-in cards, NGFF connectors, a motherboard, a unit using Wi-Fi® technology or Bluetooth® technology, a USB link, a UART link, display engine 1012, an integrated memory controller 1020, direct media interface (DMI) 1016, PCIe® interfaces 1014 (e.g., PCIe® Graphics (PEG) port interfaces for PEG adapters), PCIe® bridge 1018, equivalents thereof, and so forth.

The responding component 110 may include replay detection means for detecting a retransmission of a timing protocol message and for setting an internal timing state of the responding component as invalid in response to the retransmission, wherein the timing protocol message comprises at least one of a timing protocol request or a timing protocol response. In one embodiment, replay detection means includes replay detection logic 132. In another embodiment, replay detection means includes PTM controller 910. In another embodiment, replay detection means includes Lnk TLP processing 906. In another embodiment, replay detection means includes retry buffer 916.

The responding component 110 may include validation means for detecting at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation means is for setting the internal timing state of the responding component as valid in response to completion of the at least two consecutive timing protocol dialogs. In one embodiment, validation means includes validation logic 134. In another embodiment, validation means includes PTM controller 910.

Figure 10:
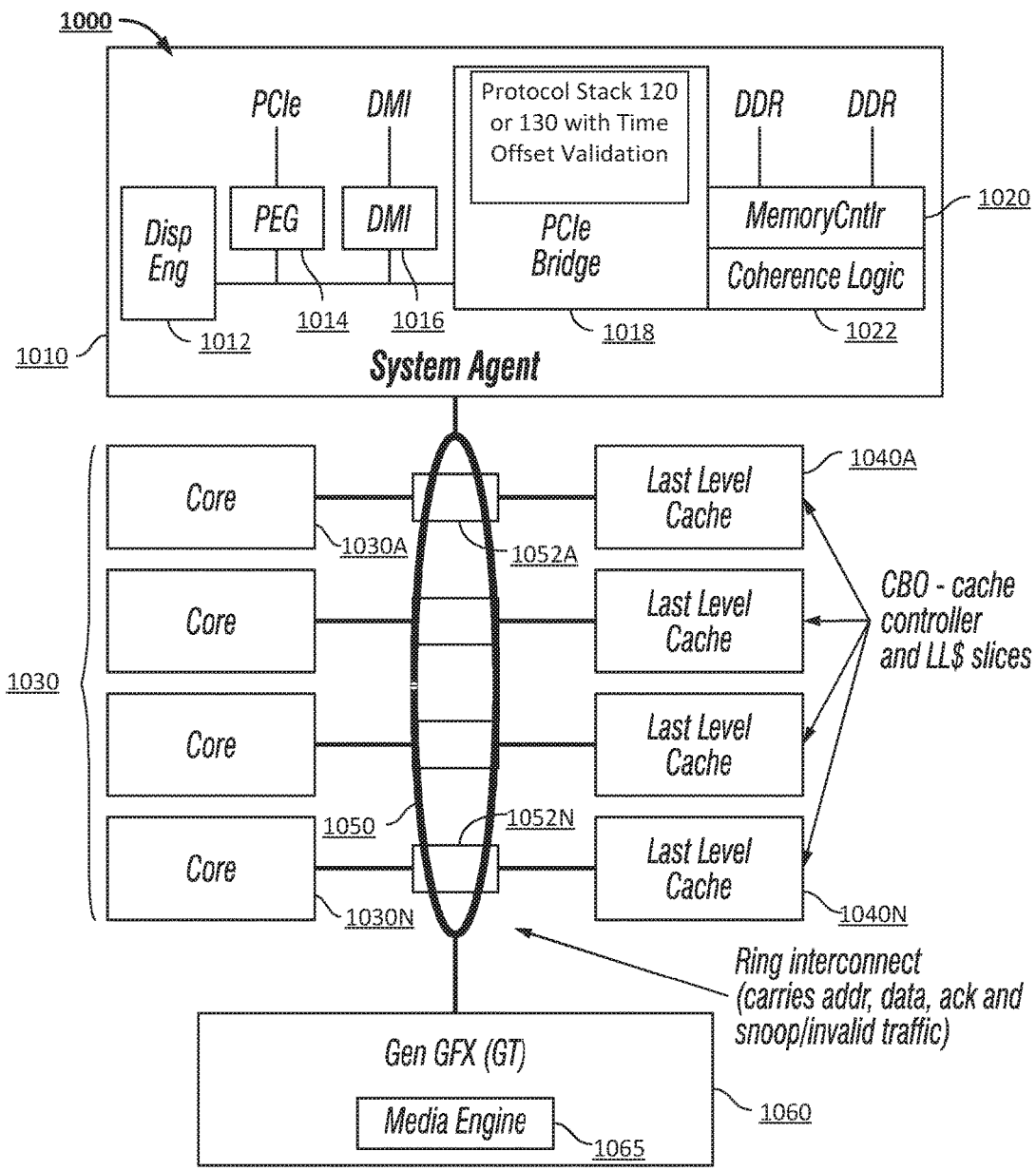
FIG. 10 illustrates a block diagram of a multicore processor, according to one embodiment.

Referring now to FIG. 10, shown is a block diagram of an embodiment of a multicore processor. As shown in the embodiment of FIG. 10, processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. As seen in FIG. 10, interconnect 1050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel® On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe® interfaces 1014 (e.g., PCIe® Graphics (PEG) port interfaces for PEG adapters). The display engine and these interfaces typically couple to memory via a PCIe® bridge 1018. In one embodiment, PCIe® bridge 1018 includes protocol stack 120 or 130 with time offset validation. In another embodiment, PCIe® bridge 1018 includes protocol stack 120 or 130 with time offset validation. Upward facing ports may be requesting components 105 and downward facing ports may be responding components 110. In another embodiment, one or more of the PCIe® interfaces 1014 include protocol stack 120 or 130 with time offset validation. Still further, to provide for communications between other agents, such as additional processors or other circuitry, one or more other interfaces (e.g. an Intel® Quick Path Interconnect (QPI) fabric) may be provided.

A PCIe® interface 1014 may connect with another component via a link 115. The protocol stack 120 or 130 sends PTM messages to the other component via link 115 and receives PTM messages from the other component via link 115. Upon detecting retransmission of a PTM message, protocol stack 120 or 130 sets the internal timing state as invalid until the protocol stack 120 or 130 completes two consecutive PTM dialogs.

Figure 11:
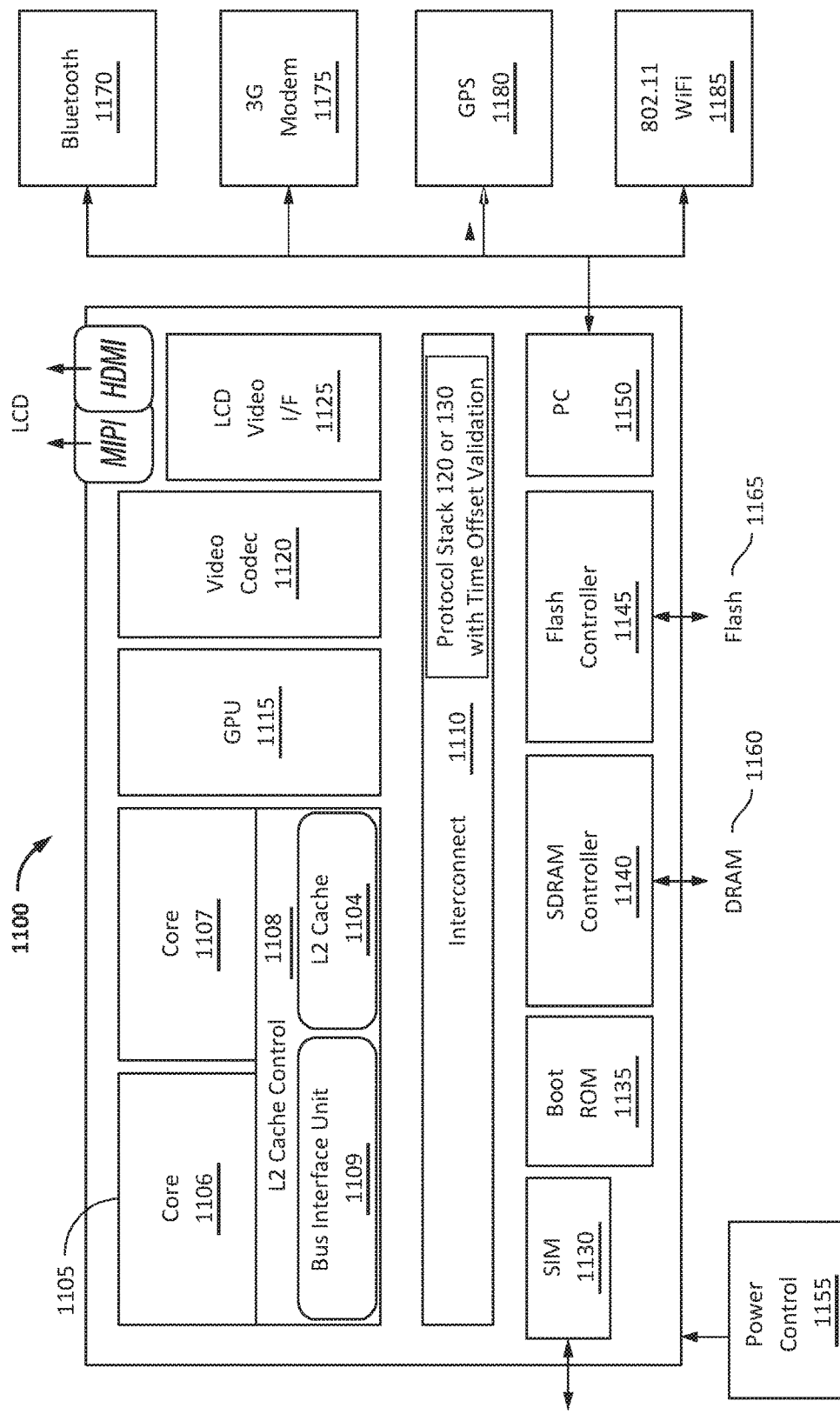
FIG. 11 illustrates a system on a chip (SOC) design, according to one embodiment.

Turning next to FIG. 11, an embodiment of a system on-chip (SOC) design in accordance with the disclosures is depicted. As a specific illustrative example, SOC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Similar to the discussion above, cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1104 to communicate with other parts of system 1100. Interconnect 1110 includes an on-chip interconnect, such as an IOSF, AMBA, or other interconnect discussed above, which potentially implements one or more aspects of the described disclosure. In one embodiment, interconnect 1110 includes protocol stack 120 with time offset validation. In another embodiment, interconnect 1110 includes protocol stack 130 with time offset validation.

Interface 1110 provides communication channels to the other components, such as a Subscriber Identity Module (SIM) 1130 to interface with a SIM card, a boot rom 1135 to hold boot code for execution by cores 1106 and 1107 to initialize and boot SOC 1100, a SDRAM controller 1140 to interface with external memory (e.g. DRAM 1160), a flash controller 1145 to interface with non-volatile memory (e.g. Flash 1165), a peripheral control Q1650 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein.

Interconnect 1110 may connect with another component via a link 115 (e.g., on-chip interconnect, IOSF, AMBA, or other interconnect). The protocol stack 120 or 130 sends timing protocol messages to the other component via link 115 and receives timing protocol messages from the other component via link 115. Upon detecting retransmission of a timing protocol message, protocol stack 120 or 130 sets the internal timing state as invalid until the protocol stack 120 or 130 completes two consecutive timing protocol dialogs.

In addition, the system illustrates peripherals for communication, such as a Bluetooth® module 1170, 3G modem 1175, GPS 1185, and Wi-Fi® 1185. Note as stated above, a UE includes a radio for communication. As a result, these peripheral communication modules are not all required. However, in a UE some form a radio for external communication is to be included.

Figure 12:
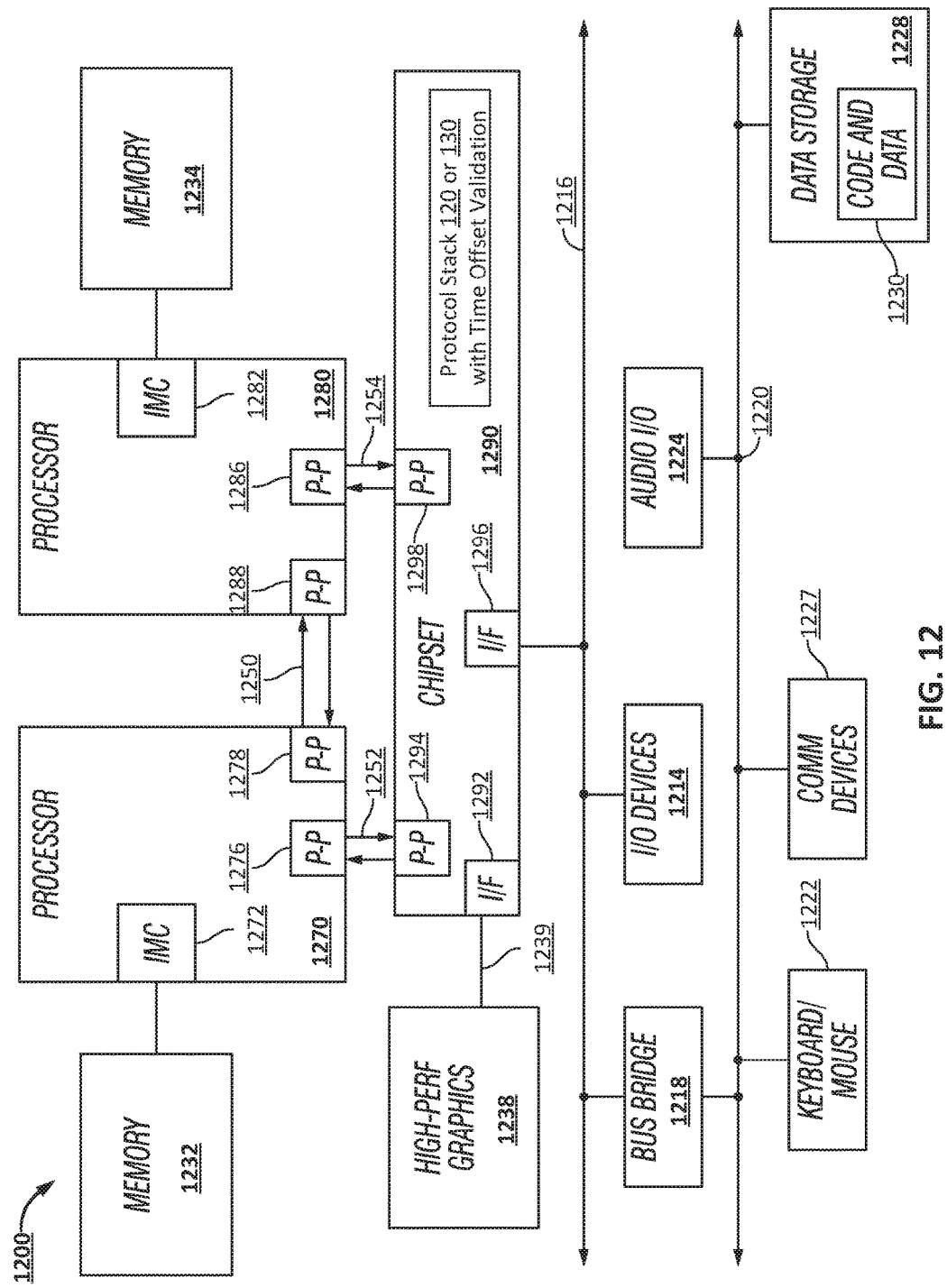
FIG. 12 illustrates a block diagram for a computing system, according to one embodiment.

Referring now to FIG. 12, shown is a block diagram of a system 1200 in accordance with an embodiment of the disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel® Quick Path Interconnect (QPI) architecture. As a result, the disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239. In one embodiment, chipset 1290 includes protocol stack 120 with time offset validation. In another embodiment, chipset 1290 includes protocol stack 130 with time offset validation.

Chipset 1290 may connect with another component via a link 115 (e.g., P-P interface 1252, P-P interface 1254, high-performance graphics interconnect 1239, bus 1216, and so forth). The protocol stack 120 or 130 sends timing protocol messages to the other component via link 115 and receives timing protocol messages from the other component via link 115. Upon detecting retransmission of a timing protocol message, protocol stack 120 or 130 sets the internal timing state as invalid until the protocol stack 120 or 130 completes two consecutive timing protocol dialogs.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

The following examples pertain to further embodiments.

Example 1 is a requesting component comprising: transmission logic to transmit timing protocol requests to a responding component via a link; receiving logic to receive timing protocol responses from the responding component via the link in response to the timing protocol requests; replay detection logic to detect a retransmission of a timing protocol message and to set an internal timing state of the requesting component as invalid in response to the retransmission, wherein the timing protocol message comprises at least one of a timing protocol request or a timing protocol response; and validation logic to detect at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation logic is to set the internal timing state of the requesting component as valid in response to completion of the at least two consecutive timing protocol dialogs.

In Example 2, the subject matter of Example 1, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 3, the subject matter of any one of Examples 1-2, wherein the completion of the at least two consecutive timing protocol dialogs comprises receiving the second non-retransmitted timing protocol response, wherein the second non-retransmitted timing protocol response has a data payload.

In Example 4, the subject matter of any one of Examples 1-3, wherein the requesting component consecutively transmits, via the transmission logic, timing protocol requests until the at least two consecutive timing protocol dialogs complete with any retransmissions.

In Example 5, the subject matter of any one of Examples 1-4, wherein the validation logic is to set the internal timing state as valid using timing information from the second non-retransmitted timing protocol response.

In Example 6, the subject matter of any one of Examples 1-5, wherein the receiving logic is to disregard data payloads of timing protocol responses received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 7 is a responding component comprising: receiving logic to receive timing protocol requests from a requesting component via a link; transmission logic to transmit timing protocol responses to the requesting component via the link in response to the timing protocol requests; replay detection logic to detect a retransmission of a timing protocol message and to set an internal timing state of the responding component as invalid in response to the retransmission, wherein the timing protocol message comprises at least one of a timing protocol request or a timing protocol response; and validation logic to detect at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation logic is to set the internal timing state of the responding component as valid in response to completion of the at least two consecutive timing protocol dialogs.

In Example 8, the subject matter of Example 7, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 9, the subject matter of any one of Examples 7-8, wherein the completion of the at least two consecutive timing protocol dialogs comprises transmitting the second non-retransmitted timing protocol response, wherein the second non-retransmitted timing protocol response has a data payload.

In Example 10, the subject matter of any one of Examples 7-9, wherein, the transmission logic is to transmit timing protocol responses without data payloads in response to timing protocol requests received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 11 is a method comprising: transmitting, via transmission logic of a requesting component, timing protocol requests to a responding component via a link; detecting, via replay detection logic of the requesting component, a retransmission of a timing protocol message, wherein the timing protocol message comprises at least one of a timing protocol request or a timing protocol response; setting, via the replay detection logic, an internal timing state of the requesting component as invalid in response to the retransmission; detecting, via validation logic of the requesting component, at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response; and setting, via the validation logic, the internal timing state of the requesting component as valid in response to completion of the at least two consecutive timing protocol dialogs.

In Example 12, the subject matter of Example 11, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 13, the subject matter of any one of Examples 11-12, wherein the completion of the at least two consecutive timing protocol dialogs comprises receiving the second non-retransmitted timing protocol response, wherein the second non-retransmitted timing protocol response has a data payload.

In Example 14, the subject matter of any one of Examples 11-13, wherein the transmission logic consecutively transmits the first non-retransmitted timing protocol response and the second non-retransmitted timing protocol request to the responding component.

In Example 15, the subject matter of any one of Examples 11-14, wherein setting the internal timing state as valid comprises using timing information from the second non-retransmitted timing protocol response.

In Example 16, the subject matter of any one of Examples 11-15 further comprising disregarding data payloads of timing protocol responses received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 17 is a method comprising: receiving, via receiving logic of a responding component, timing protocol requests from a requesting component via a link; detecting, via replay detection logic of the responding component, a retransmission of a timing protocol message, wherein the timing protocol message comprises at least one of a timing protocol request or a timing protocol response; setting, via the replay detection logic, an internal timing state of the responding component as invalid in response to the retransmission; receiving, via the receiving logic, a first non-retransmitted timing protocol request from the requesting component; transmitting, via transmission logic of the responding component, a first non-retransmitted timing protocol response without a data payload to the requesting component in response to the first non-retransmitted timing protocol request; receiving, via the receiving logic, a second non-retransmitted timing protocol request from the requesting component, wherein the first non-retransmitted timing protocol request and the second non-retransmitted timing protocol request are consecutive; and transmitting, via the transmission logic, a second non-retransmitted timing protocol response with a data payload to the requesting component in response to the second non-retransmitted timing protocol request.

In Example 18, the subject matter of Example 17, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 19, the subject matter of any one of Examples 17-18 further comprising: detecting, via validation logic of the responding component, at least two consecutive timing protocol dialogs comprising a first timing protocol dialog and a second timing protocol dialog, the first timing protocol dialog comprising the first non-retransmitted timing protocol request and the first non-retransmitted timing protocol response, the second timing protocol dialog comprising the second non-retransmitted timing protocol request and the second non-retransmitted timing protocol response; and setting, via the validation logic, the internal timing state of the responding component as valid in response to completion of the at least two consecutive timing protocol dialogs.

In Example 20, the subject matter of any one of Examples 17-19, wherein the completion of at the least two consecutive timing protocol dialogs comprises transmitting the second non-retransmitted timing protocol response.

In Example 21, the subject matter of any one of Examples 17-20 further comprising transmitting timing protocol responses without data payloads in response to timing protocol requests received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 22 is a system comprising: a requesting component comprising first transmission logic to transmit timing protocol requests and first receiving logic to receive timing protocol responses; and a responding component coupled to the responding component over physical traces, the responding component comprising: second receiving logic to receive the timing protocol requests; second transmission logic to transmit the timing protocol responses in response to the timing protocol requests; second replay detection logic to detect a retransmission of a timing protocol message and to set an internal timing state of the responding component as invalid in response to the retransmission, wherein the timing protocol message comprises at least one of a timing protocol request or a timing protocol response; and second validation logic to detect at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the second validation logic is to set the internal timing state of the responding component as valid in response to completion of the at least two consecutive timing protocol dialogs.

In Example 23, the subject matter of Example 22, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 24, the subject matter of any one of Examples 22-23, wherein the requesting component further comprises: first replay detection logic to detect the retransmission and set an internal timing state of the requesting component as invalid in response to the retransmission; and first validation logic to detect the at least two consecutive timing protocol dialogs and set the internal timing state of the requesting component as valid in response to completion of the at least two consecutive timing protocol dialogs.

In Example 25, the subject matter of any one of Examples 22-24, wherein the completion of the at least two consecutive timing protocol dialogs comprises transmitting the second non-retransmitted timing protocol response, wherein the second non-retransmitted timing protocol response has a data payload.

Various embodiments can have different combinations of the structural features described above. For instance, all optional features of the computing system described above can also be implemented with respect to the method or process described herein and specifics in the examples can be used anywhere in one or more embodiments.

Example 26 is a system comprising: a responding component comprising second receiving logic to receive timing protocol requests and second transmission logic to transmit timing protocol responses in response to the timing protocol requests; and a requesting component coupled to the responding component over physical traces, the requesting component comprising: first transmission logic to transmit the timing protocol requests; first receiving logic to receive the timing protocol responses; first replay detection logic to detect a retransmission of a timing protocol message and to set an internal timing state of the requesting component as invalid in response to the retransmission, wherein the timing protocol message comprises at least one of a timing protocol request or a timing protocol response; and first validation logic to detect at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the first validation logic is to set the internal timing state of the requesting component as valid in response to completion of the at least two consecutive timing protocol dialogs.

In Example 27, the subject matter of Example 26, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 28, the subject matter of any one of Examples 26-27, wherein the responding component further comprises: second replay detection logic to detect the retransmission and set an internal timing state of the responding component as invalid in response to the retransmission; and second validation logic to detect the at least two consecutive timing protocol dialogs and set the internal timing state of the responding component as valid in response to completion of the at least two consecutive timing protocol dialogs.

In Example 29, the subject matter of any one of Examples 26-28, wherein the completion of the at least two consecutive timing protocol dialogs comprises receiving the second non-retransmitted timing protocol response, wherein the second non-retransmitted timing protocol response has a data payload.

In Example 30, the subject matter of any one of Examples 26-29, wherein the requesting component consecutively transmits, via the transmission logic, timing protocol requests until the at least two consecutive timing protocol dialogs complete with any retransmissions.

In Example 31, the subject matter of any one of Examples 26-30, wherein the validation logic is to set the internal timing state as valid using timing information from the second non-retransmitted timing protocol response.

In Example 32, the subject matter of any one of Examples 26-31, wherein the receiving logic is to disregard data payloads of timing protocol responses received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 33 is an apparatus comprising means to perform the method as claimed in any of claims 11-21.

Example 34 is an apparatus comprising means for performing the method of any one of claims 11-21.

Example 35 is at least one machine readable medium comprising a plurality of instructions, when executed, to implement a method or realize an apparatus as claimed in any of claims 11-21.

Example 36 is an apparatus comprising a processor configured to perform the method of any one of claims 11-21.

Example 37 is a requesting component comprising: transmission means for transmitting timing protocol requests to a responding component via a link; receiving means for receiving timing protocol responses from the responding component via the link in response to the timing protocol requests; replay detection means for detecting a retransmission of a timing protocol message and for setting an internal timing state of the requesting component as invalid in response to the retransmission, wherein the timing protocol message comprises at least one of a timing protocol request or a timing protocol response; and validation means for detecting at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation means is for setting the internal timing state of the requesting component as valid in response to completion of the at least two consecutive timing protocol dialogs.

In Example 38, the subject matter of Example 37, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 39, the subject matter of any one of Examples 37-48, wherein the completion of the at least two consecutive timing protocol dialogs comprises receiving the second non-retransmitted timing protocol response, wherein the second non-retransmitted timing protocol response has a data payload.

In Example 40, the subject matter of any one of Examples 37-39, wherein the transmission means is for consecutively transmitting timing protocol requests until the at least two consecutive timing protocol dialogs complete with any retransmissions.

In Example 41, the subject matter of any one of Examples 37-40, wherein the validation means is for setting the internal timing state as valid using timing information from the second non-retransmitted timing protocol response.

In Example 42, the subject matter of any one of Examples 37-41, wherein the receiving means is for disregarding data payloads of timing protocol responses received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 43 is a responding component comprising: receiving means for receiving timing protocol requests from a requesting component via a link; transmission means for transmitting timing protocol responses to the requesting component via the link in response to the timing protocol requests; replay detection means for detecting a retransmission of a timing protocol message and for setting an internal timing state of the responding component as invalid in response to the retransmission, wherein the timing protocol message comprises at least one of a timing protocol request or a timing protocol response; validation means for detecting at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation means is for setting the internal timing state of the responding component as valid in response to completion of the at least two consecutive timing protocol dialogs.

In Example 44, the subject matter of Example 43, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 45, the subject matter of any one of Examples 43-44, wherein the completion of the at least two consecutive timing protocol dialogs comprises transmitting the second non-retransmitted timing protocol response, wherein the second non-retransmitted timing protocol response has a data payload.

In Example 46, the subject matter of any one of Examples 43-45, wherein, the transmission means is for transmitting timing protocol responses without data payloads in response to timing protocol requests received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 47 is a non-transitory computer-readable medium comprising instructions that, when executed by a processor coupled to a requesting component, cause the requesting component to: transmit, via transmission logic of the requesting component, timing protocol requests to a responding component via a link; detect, via replay detection logic of the requesting component, a retransmission of a timing protocol message, wherein the timing protocol message comprises at least one of a timing protocol request or a timing protocol response; set, via the replay detection logic, an internal timing state of the requesting component as invalid in response to the retransmission; detect, via validation logic of the requesting component, at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response; and set, via the validation logic, the internal timing state of the requesting component as valid in response to completion of the at least two consecutive timing protocol dialogs.

In Example 48, the subject matter of Example 47, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 49, the subject matter of any one of Examples 47-48, wherein the completion of the at least two consecutive timing protocol dialogs comprises receiving the second non-retransmitted timing protocol response, wherein the second non-retransmitted timing protocol response has a data payload.

In Example 50, the subject matter of any one of Examples 47-49, wherein the transmission logic consecutively transmits the first non-retransmitted timing protocol response and the second non-retransmitted timing protocol request to the responding component.

In Example 51, the subject matter of any one of Examples 47-50, wherein setting the internal timing state as valid comprises using timing information from the second non-retransmitted timing protocol response.

In Example 52, the subject matter of any one of Examples 47-51, wherein the instructions, when executed, further cause the requesting component to disregard data payloads of timing protocol responses received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

Example 53 is a non-transitory computer-readable medium comprising instructions that, when executed by a processor coupled to a responding component, cause the responding component to: receive, via receiving logic of the responding component, timing protocol requests from a requesting component via a link; detect, via replay detection logic of the responding component, a retransmission of a timing protocol message, wherein the timing protocol message comprises at least one of a timing protocol request or a timing protocol response; set, via the replay detection logic, an internal timing state of the responding component as invalid in response to the retransmission; receive, via the receiving logic, a first non-retransmitted timing protocol request from the requesting component; transmit, via transmission logic of the responding component, a first non-retransmitted timing protocol response without a data payload to the requesting component in response to the first non-retransmitted timing protocol request; receive, via the receiving logic, a second non-retransmitted timing protocol request from the requesting component, wherein the first non-retransmitted timing protocol request and the second non-retransmitted timing protocol request are consecutive; and transmit, via the transmission logic, a second non-retransmitted timing protocol response with a data payload to the requesting component in response to the second non-retransmitted timing protocol request.

In Example 54, the subject matter of Example 53, wherein each timing protocol request comprises a Precision Timing Measurement (PTM) request, each timing protocol response comprises a PTM response, the timing protocol message comprises a PTM message, and each timing protocol dialog comprises a PTM dialog.

In Example 55, the subject matter of any one of Examples 53-54, wherein the instructions, when executed, further cause the responding component to: detect, via validation logic of the responding component, at least two consecutive timing protocol dialogs comprising a first timing protocol dialog and a second timing protocol dialog, the first timing protocol dialog comprising the first non-retransmitted timing protocol request and the first non-retransmitted timing protocol response, the second timing protocol dialog comprising the second non-retransmitted timing protocol request and the second non-retransmitted timing protocol response;

and set, via the validation logic, the internal timing state of the responding component as valid in response to completion of the at least two consecutive timing protocol dialogs.

In Example 56, the subject matter of any one of Examples 53-55, wherein the completion of the at least two consecutive timing protocol dialogs comprises transmitting the second non-retransmitted timing protocol response.

In Example 57, the subject matter of any one of Examples 53-55, wherein the instructions, when executed, further cause the responding component to transmit timing protocol responses without data payloads in response to timing protocol requests received after the retransmission until at least one timing protocol dialog that does not have errors or retransmissions completes.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," "transmitting," "detecting," "setting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A requesting component comprising:
   transmission logic to transmit timing protocol requests to a responding component via a link;
   receiving logic to receive timing protocol responses from the responding component via the link in response to the timing protocol requests;
   replay detection logic to detect a retransmission of a timing protocol message and to set an internal timing state of the requesting component as invalid in response to the retransmission, wherein the timing protocol message comprises at least one of a timing protocol request or a timing protocol response, wherein local clocks of the requesting component are to be disabled in response to the internal timing state being set as invalid; and
   validation logic to detect at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation logic is to set the internal timing state of the requesting component as valid in response to completion of the at least two consecutive timing protocol dialogs, wherein the local clocks of the requesting component are to be enabled in response to the internal timing state being set as valid.

2. The requesting component of claim 1, wherein each timing protocol request comprises a Precision Timing Measurement (PTM) request, each timing protocol response comprises a PTM response, the timing protocol message comprises a PTM message, and each timing protocol dialog comprises a PTM dialog.

3. The requesting component of claim 1, wherein the completion of the at least two consecutive timing protocol dialogs comprises receiving the second non-retransmitted timing protocol response, wherein the second non-retransmitted timing protocol response has a data payload.

4. The requesting component of claim 1, wherein the requesting component consecutively transmits, via the transmission logic, timing protocol requests until the at least two consecutive timing protocol dialogs complete with any retransmissions.

5. The requesting component of claim 1, wherein the validation logic is to set the internal timing state as valid using timing information from the second non-retransmitted timing protocol response.

6. The requesting component of claim 1, wherein the receiving logic is to disregard data payloads of timing protocol responses received after the retransmission until at least one timing protocol dialog that does not have errors or retransmissions completes.

7. A responding component comprising:
receiving logic to receive timing protocol requests from a requesting component via a link;
transmission logic to transmit timing protocol responses to the requesting component via the link in response to the timing protocol requests;
replay detection logic to detect a retransmission of a timing protocol message and to set an internal timing state of the responding component as invalid in response to the retransmission, wherein the timing protocol message comprises at least one of a timing protocol request or a timing protocol response, wherein local clocks of the responding component are to be disabled in response to the internal timing state being set as invalid; and
validation logic to detect at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the validation logic is to set the internal timing state of the responding component as valid in response to completion of the at least two consecutive timing protocol dialogs, wherein the local clocks of the responding component are to be enabled in response to the internal timing state being set as valid.

8. The responding component of claim 7, wherein each timing protocol request comprises a Precision Timing Measurement (PTM) request, each timing protocol response comprises a PTM response, the timing protocol message comprises a PTM message, and each timing protocol dialog comprises a PTM dialog.

9. The responding component of claim 7, wherein the completion of the at least two consecutive timing protocol dialogs comprises transmitting the second non-retransmitted timing protocol response, wherein the second non-retransmitted timing protocol response has a data payload.

10. The responding component of claim 7, wherein, the transmission logic is to transmit timing protocol responses without data payloads in response to timing protocol requests received after the retransmission until at least one timing protocol dialog that does not have errors or retransmissions completes.

11. A method comprising:
transmitting, via transmission logic of a requesting component, timing protocol requests to a responding component via a link;
detecting, via replay detection logic of the requesting component, a retransmission of a timing protocol message, wherein the timing protocol message comprises at least one of a timing protocol request or a timing protocol response;
setting, via the replay detection logic, an internal timing state of the requesting component as invalid in response to the retransmission, wherein local clocks of the requesting component are to be disabled in response to the setting of the internal timing state as invalid;
detecting, via validation logic of the requesting component, at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response; and
setting, via the validation logic, the internal timing state of the requesting component as valid in response to completion of the at least two consecutive timing protocol dialogs, wherein the local clocks of the requesting component are to be enabled in response to the setting of the internal timing state as valid.

12. The method of claim 11, wherein each timing protocol request comprises a Precision Timing Measurement (PTM) request, each timing protocol response comprises a PTM response, the timing protocol message comprises a PTM message, and each timing protocol dialog comprises a PTM dialog.

13. The method of claim 11, wherein the completion of the at least two consecutive timing protocol dialogs comprises receiving the second non-retransmitted timing protocol response, wherein the second non-retransmitted timing protocol response has a data payload.

14. The method of claim 11, wherein the transmission logic consecutively transmits the first non-retransmitted timing protocol response and the second non-retransmitted timing protocol request to the responding component.

15. The method of claim 11, wherein setting the internal timing state as valid comprises using timing information from the second non-retransmitted timing protocol response.

16. The method of claim 11 further comprising disregarding data payloads of timing protocol responses received after the retransmission until at least one timing protocol dialog that does not have errors or retransmissions completes.

17. A method comprising:
receiving, via receiving logic of a responding component, timing protocol requests from a requesting component via a link;
detecting, via replay detection logic of the responding component, a retransmission of a timing protocol message, wherein the timing protocol message comprises at least one of a timing protocol request or a timing protocol response;

setting, via the replay detection logic, an internal timing state of the responding component as invalid in response to the retransmission, wherein local clocks of the responding component are to be disabled in response to the setting of the internal timing state as invalid;

receiving, via the receiving logic, a first non-retransmitted timing protocol request from the requesting component;

transmitting, via transmission logic of the responding component, a first non-retransmitted timing protocol response without a data payload to the requesting component in response to the first non-retransmitted timing protocol request;

receiving, via the receiving logic, a second non-retransmitted timing protocol request from the requesting component, wherein the first non-retransmitted timing protocol request and the second non-retransmitted timing protocol request are consecutive; and transmitting, via the transmission logic, a second non-retransmitted timing protocol response with a data payload to the requesting component in response to the second non-retransmitted timing protocol request.

18. The method of claim 17, wherein each timing protocol request comprises a Precision Timing Measurement (PTM) request, each timing protocol response comprises a PTM response, the timing protocol message comprises a PTM message, and each timing protocol dialog comprises a PTM dialog.

19. The method of claim 17 further comprising:
detecting, via validation logic of the responding component, at least two consecutive timing protocol dialogs comprising a first timing protocol dialog and a second timing protocol dialog, the first timing protocol dialog comprising the first non-retransmitted timing protocol request and the first non-retransmitted timing protocol response, the second timing protocol dialog comprising the second non-retransmitted timing protocol request and the second non-retransmitted timing protocol response; and
setting, via the validation logic, the internal timing state of the responding component as valid in response to completion of the at least two consecutive timing protocol dialogs, wherein the local clocks of the responding component are to be enabled in response to the setting of the internal timing state as valid.

20. The method of claim 19, wherein the completion of at the least two consecutive timing protocol dialogs comprises transmitting the second non-retransmitted timing protocol response.

21. The method of claim 17 further comprising transmitting timing protocol responses without data payloads in response to timing protocol requests received after the retransmission until at least one timing protocol dialog that does not have errors or retransmissions completes.

22. A system comprising:
a requesting component comprising first transmission logic to transmit timing protocol requests and first receiving logic to receive timing protocol responses; and
a responding component coupled to the responding component over physical traces, the responding component comprising:
second receiving logic to receive the timing protocol requests;
second transmission logic to transmit the timing protocol responses in response to the timing protocol requests;
second replay detection logic to detect a retransmission of a timing protocol message and to set an internal timing state of the responding component as invalid in response to the retransmission, wherein the timing protocol message comprises at least one of a timing protocol request or a timing protocol response, wherein local clocks of the responding component are to be disabled in response to the internal timing state of the responding component being set as invalid; and
second validation logic to detect at least two consecutive timing protocol dialogs comprising a first timing protocol dialog and a second timing protocol dialog, the first timing protocol dialog comprising a first non-retransmitted timing protocol request and a first non-retransmitted timing protocol response, the second timing protocol dialog comprising a second non-retransmitted timing protocol request and a second non-retransmitted timing protocol response, wherein the second validation logic is to set the internal timing state of the responding component as valid in response to completion of the at least two consecutive timing protocol dialogs, wherein the local clocks of the responding component are to be enabled in response to the internal timing state of the responding component being set as valid.

23. The system of claim 22, wherein each timing protocol request comprises a Precision Timing Measurement (PTM) request, each timing protocol response comprises a PTM response, the timing protocol message comprises a PTM message, and each timing protocol dialog comprises a PTM dialog.

24. The system of claim 22, wherein the requesting component further comprises:
first replay detection logic to detect the retransmission and set an internal timing state of the requesting component as invalid in response to the retransmission; and
first validation logic to detect the at least two consecutive timing protocol dialogs and set the internal timing state of the requesting component as valid in response to completion of the at least two consecutive timing protocol dialogs.

25. The system of claim 22, wherein the completion of the at least two consecutive timing protocol dialogs comprises transmitting the second non-retransmitted timing protocol response, wherein the second non-retransmitted timing protocol response has a data payload.

* * * * *